United States Patent
Berg et al.

(10) Patent No.: US 12,542,859 B2
(45) Date of Patent: Feb. 3, 2026

(54) METHOD OF DETERMINING THE CONCENTRATION OF AN ANALYTE IN A SAMPLE OF A BODY FLUID USING A CAMERA AND A COLOR REFERENCE CARD

(71) Applicant: Roche Diabetes Care, Inc., Indianapolis, IN (US)

(72) Inventors: Max Berg, Mannheim (DE); Fredrik Hailer, Rhineland-Palatinate (DE); Bernhard Limburg, Soergenloch (DE); Volker Tuerck, Berlin (DE); Momme Winkelnkemper, Berlin (DE)

(73) Assignee: Roche Diabetes Care, Inc., Indianapolis, IN (US)

( * ) Notice: Subject to any disclaimer, the term of this patent is extended or adjusted under 35 U.S.C. 154(b) by 602 days.

(21) Appl. No.: 18/063,492

(22) Filed: Dec. 8, 2022

(65) Prior Publication Data

US 2023/0103160 A1    Mar. 30, 2023

Related U.S. Application Data

(63) Continuation of application No. PCT/EP2021/065087, filed on Jun. 7, 2021.

(30) Foreign Application Priority Data

Jun. 9, 2020   (EP) .................................... 20179002
Jul. 30, 2020  (EP) .................................... 20188732

(51) Int. Cl.
  *H04N 1/60*    (2006.01)
  *A61B 5/145*   (2006.01)
  (Continued)

(52) U.S. Cl.
  CPC ............... *H04N 1/60* (2013.01); *A61B 5/145* (2013.01); *G06T 5/92* (2024.01); *G06V 10/60* (2022.01);
  (Continued)

(58) Field of Classification Search
  CPC .......... A61B 5/145; G06V 10/60; G06T 5/92; H04N 9/73
  See application file for complete search history.

(56) References Cited

U.S. PATENT DOCUMENTS 9,506,855 B2   11/2016   Papautsky et al.
9,787,815 B2   10/2017   Erickson et al.
(Continued)

FOREIGN PATENT DOCUMENTS

EP   2 916 117 A1   9/2015
EP   2 526 683 B1   1/2016
(Continued)

OTHER PUBLICATIONS

International Search Report and Written Opinion of the International Searching Authority, PCT/EP2021/065087, Sep. 10, 2021, 13 pages.
(Continued)

*Primary Examiner* — Barbara D Reinier
(74) *Attorney, Agent, or Firm* — Bose McKinney & Evans LLP

(57) ABSTRACT

A method of determining the concentration of an analyte in a sample of a body fluid with a mobile device having a camera is disclosed. The camera captures an image of a color reference card and of a reagent test field of an optical test strip having a sample applied to it. A predetermined pixel-based mean tone map correction is applied to the image obtained, which results in a first intensity-corrected image. Local brightness information is derived from the first inten-
(Continued)

sity-corrected image. A mobile device-specific tone map correction is applied to the first intensity-corrected image, taking into account the local brightness information. A second intensity-corrected image is thereby obtained. Analyte concentration is determined based on a color formation reaction of the test field by using the second intensity-corrected image. Optionally, a color correction may be derived and applied to the second intensity-corrected image to obtain an intensity-corrected and color-corrected image.

14 Claims, 9 Drawing Sheets

(51) Int. Cl.
 G06T 5/92 (2024.01)
 G06V 10/60 (2022.01)
 H04N 9/73 (2023.01)
(52) U.S. Cl.
 CPC ..... *H04N 9/73* (2013.01); *G06T 2207/10024* (2013.01)

(56) References Cited

U.S. PATENT DOCUMENTS

| | | | |
|---|---|---|---|
| 10,068,329 B2* | 9/2018 | Adiri | G06T 5/90 |
| 2018/0146175 A1 | 5/2018 | Mui | |
| 2020/0126226 A1 | 4/2020 | Adiri et al. | |
| 2020/0374447 A1 | 11/2020 | Lu et al. | |
| 2024/0230410 A1* | 7/2024 | Alperowitz | G01N 21/78 |

FOREIGN PATENT DOCUMENTS

| | | |
|---|---|---|
| EP | 2 526 684 B1 | 4/2019 |
| JP | 2020-512737 A | 4/2020 |
| WO | WO 2012/131386 A1 | 10/2012 |
| WO | WO 2015/038717 A1 | 3/2015 |
| WO | WO 2019/000409 A1 | 1/2019 |
| WO | WO 2020/094594 A1 | 5/2020 |
| WO | WO 2020/109525 A1 | 6/2020 |

OTHER PUBLICATIONS

Hönes et al., The Technology Behind Glucose Meters: Test Strips, Diabetes Technology & Therapeutics, vol. 10, Supplement 1, 2008, pp. S-10-S-26.

* cited by examiner

METHOD OF DETERMINING THE CONCENTRATION OF AN ANALYTE IN A SAMPLE OF A BODY FLUID USING A CAMERA AND A COLOR REFERENCE CARD

RELATED APPLICATIONS

This application is a continuation of PCT/EP2021/065087, filed Jun. 7, 2021, which claims priority to EP 20 188 732.0, filed Jul. 30, 2020, and also claims priority to EP 20 179 002.9, filed Jun. 9, 2020, all of which are hereby incorporated herein by reference.

BACKGROUND

This disclosure refers to a method of determining the concentration of at least one analyte in a sample of a bodily fluid. This disclosure further relates to a mobile device having at least one camera, to a kit for determining the concentration of the analyte in the sample of the bodily fluid, and further to a computer program and to a computer-readable storage medium. The method, devices, computer program and storage medium specifically may be used in medical diagnostics, in order to, for example, qualitatively and/or quantitatively detect one or more analytes in one or more body fluids, such as for detecting glucose in blood and/or interstitial fluid. Other fields of application of this disclosure, however, are also feasible.

In the field of medical diagnostics, in many cases, one or more analytes have to be detected in samples of a body fluid, such as blood, interstitial fluid, urine, saliva or other types of body fluids. Examples of analytes to be detected are glucose, triglycerides, lactate, cholesterol or other types of analytes typically present in these body fluids. According to the con-centration and/or the presence of the analyte, an appropriate treatment may be chosen, if necessary. Without narrowing the scope, this disclosure specifically may be described with respect to blood glucose measurements. It shall be noted, however, that this disclosure may also be used for other types of analytical measurements using test elements.

Generally, devices and methods known to the skilled person make use of test elements comprising one or more test chemicals, which, in presence of the analyte to be detected, are capable of performing one or more detectable detection reactions, such as optically detectable detection reactions. With regard to the test chemicals comprised in test elements, reference may be made, e.g., to J. Hoenes et al.: The Technology Behind Glucose Meters: Test Strips, Diabetes Technology & Therapeutics, Volume 10, Supplement 1, 2008, S-10 to S-26. Other types of test chemistry are possible and may be used for performing this disclosure.

In analytical measurements, specifically analytical measurements based on color formation reactions, one technical challenge resides in the evaluation of the color change which is due to the detection reaction. Besides using dedicated analytical devices, such as handheld blood glucose meters, the use of generally available electronics such as smart phones and portable computers or other mobile devices has become more and more popular over the recent years. As an example, WO 2012/131386 A1 discloses a testing apparatus for performing an assay, the testing apparatus comprising: a receptacle containing a reagent, the reagent being reactive to an applied test sample by developing a color or pattern variation; a portable device, e.g., a mobile phone or a laptop, comprising a processor and an image capture device, wherein the processor is configured to process data captured by the image capture device and output a test result for the applied test sample.

As opposed to laboratory measurements and measurements performed by using dedicated analytical measurement devices, when using mobile computing devices such as smart phones, various influences need to be taken into account. As an example, lighting conditions, positioning, vibrations or other more or less uncontrollable conditions are to be considered.

U.S. Publication No. 2018/0146175 A1 discloses a color measurement device and method for use with cameras or other imaging devices. The color measurement device may be configured to determine many different colors via a commonly owned device. Embodiments utilize sinusoidal grayscale rings to determine an exact color match of an unknown color, even if there is perspective distortion of an obtained image.

EP 2 526 683 B1 and EP 2 526 684 B1 disclose methods and systems for determining the color of a color sample from an image of the color sample.

WO 2015/038717 A1 describes a system and method for the analysis of a fluid having: an opaque container to receive a fluid sample; a color varying indicator disposed on a surface of the cup that when the cup contains a fluid sample, the surface is submerged in the fluid sample; a color standard to which a color of the color varying indicator is compared, disposed on the surface; a camera, the camera being disposed proximate to the container such that the camera has a view of the surface, the camera being coupled to a processor; an artificial light source, illuminating the surface with a standard illumination; a light diffuser disposed between the artificial light source and the surface; and wherein the processor receives images captured by the camera, extracts color values from the color varying indicator, standardizes the color values relative to the color standard, and quantitatively relates the color values to known color values of the color-varying indicator when exposed to a standardized quantity of a known reagent under test.

U.S. Publication No. 2020/0126226 A1 discloses systems and methods for analyzing visible chemical reactions. In one implementation, the method may include receiving from an image sensor associated with a mobile communications device an image of a reagent pad in proximity to a colorized surface having at least one pair of colored reference elements. The method includes identifying in the image the reagent pad, a first colored reference element, and a second colored reference element. Thereafter, the method includes using the first colored reference element and the second colored reference element to determine an extent of a chemical reaction on the reagent pad irrespective of local illumination conditions. Then the method includes causing the mobile communications device to provide data based on the extent of the chemical reaction.

Despite the advantages involved by the known methods and devices, several technical challenges remain. Specifically, the use of mobile devices to determine analyte concentrations using optical test strips may require an accurate determination of the color change of the optical test strip and, thus, often remains challenging. Generally, the observed brightness in the recorded images may also be dependent on various influencing factors, such as the brightness of the illuminating source, the shutter speed, the aperture size, the sensitivity of the sensors, the sensor gain and further any post-processing steps. Specifically, the post-processing of images captured by the mobile devices is often a device-specific process and, thus, may be unknown to the manufacturer of the measurement application. Moreover, brightness correction of the captured image often cannot be performed for the whole image, but has to be performed considering local effects, for example, due to inhomogeneous illumination conditions.

SUMMARY

This disclosure provides a method and devices for determining the concentration of an analyte in a sample of a bodily fluid, which address at least partially the above-mentioned technical challenges. Specifically, it is desirable to provide a method and devices which allow for a user-friendly mobile-based determination of the analyte in the sample of the bodily fluid, with high accuracy and reliability of the analytical measurement, and, thus, may take into account local variations and device-specific aspects.

As used in the following, the terms "have," "comprise" or "include" or any arbitrary grammatical variations thereof are used in a non-exclusive way. Thus, these terms may both refer to a situation in which, besides the feature introduced by these terms, no further features are present in the entity described in this context and to a situation in which one or more further features are present. As an example, the expressions "A has B," "A comprises B" and "A includes B" may both refer to a situation in which, besides B, no other element is present in A (i.e., a situation in which A solely and exclusively consists of B) and to a situation in which, besides B, one or more further elements are present in entity A, such as element C, elements C and D or even further elements.

Further, it shall be noted that the terms "at least one," "one or more" or similar expressions indicating that a feature or element may be present once or more than once typically will be used only once when introducing the respective feature or element. In the following, in most cases, when referring to the respective feature or element, the expressions "at least one" or "one or more" will not be repeated, non-withstanding the fact that the respective feature or element may be present once or more than once. It shall also be understood for purposes of this disclosure and appended claims that, regardless of whether the phrases "one or more" or "at least one" precede an element or feature appearing in this disclosure or claims, such element or feature shall not receive a singular interpretation unless it is made explicit herein. By way of non-limiting example, the terms "camera," "reagent field," and "image," to name just a few, should be interpreted wherever they appear in this disclosure and claims to mean "at least one" or "one or more" regardless of whether they are introduced with the expressions "at least one" or "one or more." All other terms used herein should be similarly interpreted unless it is made explicit that a singular interpretation is intended.

Further, as used in the following, the terms "preferably," "more preferably," "particularly," "more particularly," "specifically," "more specifically" or similar terms are used in conjunction with optional features, without restricting alternative possibilities. Thus, features introduced by these terms are optional features and are not intended to restrict the scope of the claims in any way. The invention may, as the skilled person will recognize, be performed by using alternative features. Similarly, features introduced by "in an embodiment of the invention" or similar expressions are intended to be optional features, without any restriction regarding alternative embodiments of the invention, without any restrictions regarding the scope of the invention and without any restriction regarding the possibility of combining the features introduced in such way with other optional or non-optional features of the invention.

In a first aspect of this disclosure, a method of determining the concentration of at least one analyte in a sample of a bodily fluid is disclosed. The method comprises using a mobile device having at least one camera. The method comprises the following steps which, as an example, may be performed in the given order. It shall be noted, however, that a different order is also possible. Further, it is also possible to perform one or more of the method steps once or repeatedly. Further, it is possible to perform two or more of the method steps simultaneously or in a timely overlapping fashion. The method may comprise further method steps which are not listed.

The method comprises:
i) capturing, by using the camera, at least one image of at least a part of a color reference card and of at least a part of at least one reagent test field of at least one optical test strip having the sample applied thereto,
   wherein, in the image, the test field is in a defined position with respect to the color reference card,
   wherein the color reference card comprises a plurality of different gray reference fields locally assigned to the test field, and
   wherein the color reference card comprises a plurality of different color reference fields having known reference color values and a plurality of different gray reference fields locally assigned to the color reference fields,
ii) applying at least one predetermined pixel-based mean tone map correction to the image obtained in step i), thereby obtaining at least one first intensity-corrected image;
iii) deriving, from the first intensity-corrected image, local brightness information for at least some of the color reference fields and for the test field, by using the gray reference fields locally assigned to the color reference fields and the test field, respectively;
iv) applying at least one local tone map correction to the first intensity-corrected image, the local tone map correction taking into account the local brightness information, thereby obtaining at least one second intensity-corrected image; and
v) determining the analyte concentration based on a color formation reaction of the test field by using the second intensity-corrected image.

The term "determining the concentration of an analyte in a sample of a bodily fluid," also referred to as an "analytical measurement," as used herein, is a broad term and is to be given its ordinary and customary meaning to a person of ordinary skill in the art and is not to be limited to a special or customized meaning. The term specifically may refer, without limitation, to a quantitatively and/or qualitatively determination of at least one analyte in an arbitrary sample or aliquot of bodily fluid. For example, the bodily fluid may comprise one or more of blood, interstitial fluid, urine, saliva or other types of body fluids. The result of the determining of the concentration, as an example, may be a concentration of the analyte and/or the presence or absence of the analyte to be determined. Specifically, as an example, the analytical measurement may be a blood glucose measurement, thus the result of the analytical measurement may, for example, be a blood glucose concentration. In particular, an analytical measurement result value may be determined by the analytical measurement.

Consequently, the term "analyte concentration value," often also referred to as "analytical measurement result value," as used herein, is a broad term and is to be given its ordinary and customary meaning to a person of ordinary skill in the art and is not to be limited to a special or customized meaning. The term specifically may refer, without limitation, to a numerical indication of an analyte concentration in a sample.

The at least one analyte, as an example, may be or may comprise one or more specific chemical compounds and/or other parameters. As an example, one or more analytes may be determined which take part in metabolism, such as blood glucose. Additionally or alternatively, other types of analytes or parameters may be determined, e.g., a pH value.

The method, as outlined above, comprises using a mobile device having at least one camera. The term "mobile device" as used herein is a broad term and is to be given its ordinary and customary meaning to a person of ordinary skill in the art and is not to be limited to a special or customized meaning. The term specifically may refer, without limitation, to a mobile electronics device, more specifically to a mobile communication device such as a cell phone or smartphone. Additionally or alternatively, as will be outlined in further detail below, the mobile device may also refer to a tablet computer or another type of portable computer having at least one camera.

The term "camera" as used herein is a broad term and is to be given its ordinary and customary meaning to a person of ordinary skill in the art and is not to be limited to a special or customized meaning. The term specifically may refer, without limitation, to a device having at least one imaging element configured for recording or capturing spatially resolved one-dimensional, two-dimensional or even three-dimensional optical data or information. As an example, the camera may comprise at least one camera chip, such as at least one CCD chip and/or at least one CMOS chip configured for recording images. As used herein, without limitation, the term "image" specifically may relate to data recorded by using a camera, such as a plurality of electronic readings from the imaging device, such as the pixels of the camera chip.

The camera, besides the at least one camera chip or imaging chip, may comprise further elements, such as one or more optical elements, e.g., one or more lenses. As an example, the camera may be a fix-focus camera, having at least one lens which is fixedly adjusted with respect to the camera. Alternatively, however, the camera may also comprise one or more variable lenses which may be adjusted, automatically or manually. This disclosure specifically shall be applicable to cameras as usually used in mobile applications such as notebook computers, tablets or, specifically, cell phones such as smart phones. Thus, specifically, the camera may be part of a mobile device which, besides the at least one camera, comprises one or more data processing devices such as one or more data processors. Other cameras, however, are feasible.

The camera specifically may be a color camera. Thus, such as for each pixel, color information may be provided or generated, such as color values for three colors R, G, B. A larger number of color values is also feasible, such as four color values for each pixel, for example, R, G, G, B. Color cameras are generally known to the skilled person. Thus, as an example, the camera chip may consist of a plurality of three or more different color sensors each, such as color recording pixels like one pixel for red (R), one pixel for green (G) and one pixel for blue (B). For each of the pixels, such as for R, G, B, values may be recorded by the pixels, such as digital values in the range of 0 to 255, depending on the intensity of the respective color. Instead of using color triples such as R, G, B, as an example, quadruples may be used, such as R, G, G, B. The color sensitivities of the pixels may be generated by color filters or by appropriate intrinsic sensitivities of the sensor elements used in the camera pixels. These techniques are generally known to the skilled person.

As further outlined above, the method comprises capturing at least one image of at least a part of a color reference card and of at least a part of at least one reagent test field of at least one optical test strip having the sample applied thereto. The term "capturing at least one image" as used herein is a broad term and is to be given its ordinary and customary meaning to a person of ordinary skill in the art and is not to be limited to a special or customized meaning. The term specifically may refer, without limitation, to one or more of imaging, image recording, image acquisition, image capturing. The term "capturing at least one image" may comprise capturing a single image and/or a plurality of images such as a sequence of images. For example, the capturing of the image may comprise recording continuously a sequence of images such as a video or a movie. The capturing of the at least one image may be initiated by the user action or may automatically be initiated, e.g., once the presence of the at least one object within a field of view and/or within a predetermined sector of the field of view of the camera is automatically detected. These automatic image acquisition techniques are known, e.g., in the field of automatic barcode readers, such as from automatic barcode reading apps. The capturing of the images may take place, as an example, by acquiring a stream or "life stream" of images with the camera, wherein one or more of the images, automatically or by user interaction such as pushing a button, are stored and used as the at least one first image or the at least one second image, respectively. The image acquisition may be supported by a processor of the mobile device, and the storing of the images may take place in a data storage device of the mobile device.

The term "optical test strip" as used herein is a broad term and is to be given its ordinary and customary meaning to a person of ordinary skill in the art and is not to be limited to a special or customized meaning. The term specifically may refer, without limitation, to an arbitrary element or device configured for performing a color-change detection reaction. The optical test strip may also be referred to as test strip or test element, wherein all three terms may refer to the same element. The optical test strip may particularly have a reagent test field containing at least one test chemical for detecting at least one analyte. The optical test strip, as an example, may comprise at least one substrate, such as at least one carrier, with the at least one reagent test field applied thereto or integrated therein. In particular, the optical test strip may further comprise at least one white area, such as a white field, specifically in a proximity to the test field, for example, enclosing or surrounding the test field. The white area may be a separate field independently arranged on the substrate or carrier. However, additionally or alternatively, the substrate or carrier itself may be or may comprise the white area. As an example, the at least one carrier may be strip-shaped, thereby rendering the test element a test strip. These test strips are generally widely in use and available. One test strip may carry a single reagent test field or a plurality of reagent test fields having identical or different test chemicals comprised therein.

The term "reagent test field," also simply referred to as "test field," as used herein is a broad term and is to be given its ordinary and customary meaning to a person of ordinary skill in the art and is not to be limited to a special or customized meaning. The term specifically may refer, without limitation, to a coherent amount of the test chemical, such as to a field, e.g., a field of round, polygonal or rectangular shape, having one or more layers of material, with at least one layer of the reagent test field having the test chemical comprised therein.

Generally, as used herein, the term "field" is a broad term and is to be given its ordinary and customary meaning to a person of ordinary skill in the art and is not to be limited to a special or customized meaning. The term specifically may refer, without limitation, to a coherent or continuous amount of material, such as a test chemical and/or a color or a coloration material. The coherent or continuous amount of material may be disposed on a surface of a substrate and/or may be disposed or integrated into the substrate. The field specifically may be a two-dimensional field, e.g., by comprising one or more layers of the material disposed onto the substrate and/or integrated into the substrate. The field specifically may have a predetermined geometrical shape, such as a rectangular shape, specifically a square shape, or another shape, such as a polygonal shape or a round shape, such as a circular shape or an elliptic shape. In the following, without restricting further possibilities, it shall be assumed that the fields have a rectangular shape. Specifically, in the context of the color reference card, the fields disposed thereon may be neighboring fields forming a matrix of fields, such as a rectangular matrix. Therein, the fields may all have the same shape and size. Alternatively, some of the fields may have a different shape, wherein, in a macroscopic perspective, the matrix arrangement of the totality of fields may still be maintained, even though some of the fields may have a larger size.

The term "color reference card" as used herein is a broad term and is to be given its ordinary and customary meaning to a person of ordinary skill in the art and is not to be limited to a special or customized meaning. The term specifically may refer, without limitation, to an arbitrary item having, disposed therein or disposed thereon, such as on at least one surface, at least one color reference field having known color properties or optical properties, such as having one or more colored fields having known reference color values, and further at least one gray reference field having known gray levels. As an example, the color reference card may be a flat card comprising at least one substrate having, on at least one surface and/or disposed therein, the plurality of color reference fields having known color coordinates and at least three gray reference fields, each gray reference field having a different known gray level. Alternatively or additionally, the color reference card may also comprise the plurality of color reference fields having known reference color values and at least one gray reference field having at least three different known gray levels. For example, the gray reference field with different gray levels may be divided into multiple sections each having a different known gray level, such as a gray reference field being divided into at least three sections each having a different known gray level. Alternatively, the gray reference field with different gray levels may comprise a continuous gradient of gray levels, such a gray reference field comprising a continuous gradient of gray levels between black and white. The substrate, specifically, may have a flat surface with the color reference fields and the gray reference fields disposed thereon. The substrate, as an example, may be or may comprise one or more of a paper substrate, a cardboard substrate, a plastic substrate, a ceramic substrate or a metal substrate. Laminate substrates are also possible. The substrate, as an example, may be sheet-like or flexible. It shall be noted, however, that the substrate may also be implemented into an article of use, such as into a wall of a box, a vile, a container, a medical consumable, such as a test strip, or the like. Thus, the color reference card may also fully or partially be integrated into the optical test strip. Thus, the at least one image of at least a part of the color reference card may fully or partially comprise an image of at least one part of the optical test strip having at least one reagent test field.

Further, the color reference card may comprise at least one position marker. The at least one position marker, as an example, may be or may comprise at least one of: an identifier for identifying the color reference card and/or the type of the color reference card, such as at least one of a label, a barcode or a QR-code; a specifier specifying details of the color reference card, such as reference color values or the like, such as by using at least one of a label, a barcode or a QR-code; a position marker and/or orientation marker, such as at least one of a fiducial mark, an ArUco code or the like. Specifically, the at least one position marker may be arranged in at least one corner of the color reference card. Thus, the mobile device may be configured for detecting and/or reading the marker, specifically by optically detecting the marker on the at least one image captured in step i), and optionally retrieving information from the marker, such as information on the type, the properties or the orientation of the color reference card.

The term "gray reference field" as used herein is a broad term and is to be given its ordinary and customary meaning to a person of ordinary skill in the art and is not to be limited to a special or customized meaning. The term specifically may refer, without limitation, to an arbitrary item, such as a field having a known or determinable limitation, having a color or a gray shade of a known gray level. The term "gray level" as used herein also is a broad term and is to be given its ordinary and customary meaning to a person of ordinary skill in the art and is not to be limited to a special or customized meaning. The term specifically may refer, without limitation, to an item of information containing intensity information of an object such as a field, specifically intensity information on a predetermined grayscale. The intensity information, specifically, may be information on a shade of gray on the grayscale level, specifically without carrying information on a color of the object. Thus, specifically, the gray level may contain a relative brightness value indicating a proportion or percentage of a mixture of black and white. For example, a gray level of 100% may indicate a black field, a gray level of 0% may indicate a white field, whereas a gray level in between 0 and 100% may indicate a mixture of black and white. Additionally or alternatively, the gray level may contain information derived from color values, specifically, however, without describing a color. Thus, the gray level may at least partially be determined by the R, G, B color values of the gray reference field, such as by using the R, G, B color values in a linear combination for determining the gray level, for example, according to: $g=0.3*R+0.59*G+0.11*B$, wherein g denotes the gray level. Other combinations such as linear combinations of the R, G, B color values for obtaining the gray level are also feasible.

The gray reference field may be a 2-dimensional structure, such as a rectangle, a square, a polygon, a circle and/or an ellipse, with a uniform gray level. The gray level of the gray reference field specifically may be one or more of predetermined, known or determinable. Further, the plurality of gray reference fields comprised by the color reference card may be locally assigned to one or more of the test field and to the plurality of color reference fields. The gray reference fields comprised by the color reference card specifically may have known, predetermined or determinable color values, specifically known RGB color values.

The term "locally assigned" as used herein is a broad term and is to be given its ordinary and customary meaning to a person of ordinary skill in the art and is not to be limited to a special or customized meaning. The term specifically may refer, without limitation, to a predetermined spatial arrangement, such as a standardized local arrangement, between at least two objects. As an example, two or more objects may be locally assigned to each other by being placed in a neighboring position. Thus, specifically, a plurality of objects such as the plurality of gray reference fields may be assigned to another object such as the test field by surrounding the test field. Consequently, all neighboring gray reference fields surrounding the test field may be locally assigned to the test field. Thus, the plurality of gray reference fields locally assigned to the test field may be arranged on the color reference card such that the plurality of gray reference fields may surround the test field of the optical test strip when the test strip is placed behind the color reference card. Further, the plurality of gray reference fields locally assigned to the at least one color reference fields may be arranged on the color reference card such that the plurality of gray reference fields may surround the at least one color reference field. Thus, the term "locally" may refer to a nearest surrounding of the color reference field and/or the reagent test field. Therein, generally, if the first object is locally assigned to a second object, this assignment is not necessarily exclude the first object from also being locally assigned to at least one third object. As an example, the first object may be neighbored to at least one second object and at least one third object and, thereby, be assigned to both the second object and the third object.

The term "color reference field" as used herein is a broad term and is to be given its ordinary and customary meaning to a person of ordinary skill in the art and is not to be limited to a special or customized meaning. The term specifically may refer, without limitation, to an arbitrary item having known optical properties, such as a known reference color value. Specifically, a color reference field comprised by the color reference card may be a 2-dimensional structure, such as a rectangle, a square, a polygon, a circle and/or an ellipse, with a uniform color value. The color value of the color reference field specifically may be one or more of predetermined, known or determinable. The color reference field may be comprised by a surface of the color reference card and/or disposed therein, specifically in such a way that the at least one color reference field may be visible in the image captured in step i). Further, the color reference fields may have color values in a subspace of the color coordinate system corresponding to the color space of the color formation reaction of the reagent test region. The color reference fields of the color reference card specifically may be arranged in a regular pattern on the surface of the color reference card, such as in a rectangular pattern, e.g., a rectangular matrix pattern. The pattern arrangement specifically may enable identifying the color reference fields, such as by searching at a predetermined distance in an x- and/or y-direction from one or more of the position markers.

Further, the color reference fields may be locally distributed over the color reference card, specifically over a part of the color reference card visible in the image. The color reference card may further comprise at least two color reference fields having different reference color values. Specifically, the color reference card may comprise a plurality of color reference fields having different color values, wherein the color values of the color reference fields may be selected from a predetermined color subspace of the color space. The predetermined color subspace may comprise at least one color value of the color formation reaction of the reagent test field.

Further, to each color reference field and/or the test field, a plurality of gray reference fields may be locally assigned, such that a color reference field and the assigned plurality of gray reference fields and/or the test field and the assigned plurality of gray reference fields may form a local group. The gray reference fields may be assigned to a plurality of local groups, such that gray reference fields may be shared by neighboring local groups. Specifically, the local group may be at least one of: a local color reference field group, such as the plurality of gray reference fields locally assigned to the color reference field; a test field group, such as the plurality of gray reference fields locally assigned to the test field. The local groups specifically may be localized in different locations of the color reference card.

The term "known color reference values" as used herein is a broad term and is to be given its ordinary and customary meaning to a person of ordinary skill in the art and is not to be limited to a special or customized meaning. The term specifically may refer, without limitation, to a predetermined, real or true color value of a color reference field. Specifically, the known reference color value may comprise at least three color values, such as at least one color value for each R, G, B color. The known reference color value for each color reference field may be stored on a data storage device of the mobile device, for example, by a look-up table, a register, a database or the like. The known reference color values may have been determined by measuring the respective color values, specifically by measuring the color values in a controlled laboratory environment, such as by using a photospectrometer. The measurement of the color reference fields using a photospectrometer may define the respective known reference color values.

As outlined above, step ii) comprises applying at least one predetermined pixel-based mean tone map correction to the image obtained in step i), thereby obtaining at least one first intensity-corrected image. The term "predetermined pixel-based mean tone map correction" as used herein is a broad term and is to be given its ordinary and customary meaning to a person of ordinary skill in the art and is not to be limited to a special or customized meaning. The term specifically may refer, without limitation, to a correlation and/or an assignment of a second brightness value to a first brightness value, wherein the first brightness value may be generated, detected or recorded by the imaging device. The correlation and/or assignment may comprise at least one mathematical operation, e.g., a multiplication with at least one factor or another type of mathematical operation. The first brightness value may be part of the first data set or raw data. The second brightness value may be part of the second data set or processed data, wherein the second brightness value may be obtained by applying the pixel-based mean tone map correction to the image captured in step i). In particular, the first brightness value may be part of the spatially resolved optical set of data comprised by the image, in particular the image obtained in step i), whereas the second brightness values may be part of the first intensity-corrected image obtained in step ii). The correlation and/or assignment may in particular be a function, specifically a continuous or discontinuous function, a curve, a lookup table, an operator or any other means describing the correlation between the first brightness value and the second brightness value. The term "pixel-based" specifically may refer to the fact that a brightness modification by applying the tone map correction takes place on the basis of the brightness values or intensity values of each of the pixels or at least of predetermined groups of pixels.

For example, the pixel-based mean tone map correction may comprise a mean tone map correction derived by combining a plurality of tone map corrections for different types of mobile devices. As another example, the pixel-based mean tone map correction may comprise an inverse of standard Gamma correction. The standard Gamma correction may refer in particular to the sRGB Gamma correction of the sRGB color space, wherein "sRGB" stands for "standard Red Green Blue." Specifically, the standard Gamma correction may be invertible. Thus, the correction may comprise applying an inverse of the standard Gamma correction to the first brightness value to obtain the second brightness value. Further, the mean tone map correction may be predetermined and, thus, may be stored on the mobile device, such as on at least one data storage device of the mobile device.

Further, the mean tone map correction may be a "pixel-based" correction such that each pixel of the recorded image or at least each predefined group of pixels may be corrected individually by the mean tone map correction. Preferably, the pixel-based mean tone map correction may be a global pixel-based mean tone map correction, such that all pixels are corrected the same way. As another example, the pixel-based mean tone map correction may be a RGB-specific mean tone map correction, such that each color of the RGB colors may be corrected with a color-specific mean tone map correction.

The term "first intensity-corrected image" as used herein is a broad term and is to be given its ordinary and customary meaning to a person of ordinary skill in the art and is not to be limited to a special or customized meaning. The term specifically may refer, without limitation, to image data obtained by applying the predetermined pixel-based tone map correction to the image data obtained in step i). Therein, the term "first" is merely meant to be a nomenclature rather than a ranking or an order.

As further outlined above, in step iii), a local brightness information is derived from the first intensity-corrected image. The term "local brightness information" as used herein is a broad term and is to be given its ordinary and customary meaning to a person of ordinary skill in the art and is not to be limited to a special or customized meaning. The term specifically may refer, without limitation, to a numerical indication describing the local intensity of at least one RGB color, specifically of the color reference field and/or the reagent test field. Further, the local brightness information is derived by using the plurality of gray color reference fields locally assigned to the color reference field and the reagent test field. Thus, as an example, the local brightness information for the respective color reference field or for the test field may be determined by using a plurality of gray reference fields surrounding the color reference field or the test field, respectively, as will be explained in further detail below. Thereby, averaged local brightness information in the area of the color reference field or the test field, respectively, may be derived, since brightness information from both sides or even all sides of the color reference field or the test field, respectively, may be taken into account.

As outlined above, in step iv), the local brightness information is taken into account when applying at least one local tone map correction. The term "local tone map correction" as used herein is a broad term and is to be given its ordinary and customary meaning to a person of ordinary skill in the art and is not to be limited to a special or customized meaning. The term specifically may refer, without limitation, to a correlation and/or an assignment of a third brightness value to the second brightness value, wherein the second brightness values may be obtained by applying the mean tone map correction to the image data generated by the imaging device. The local tone map correction may also be or may comprise at least one mathematical operation, e.g., a multiplication with at least one factor or another type of mathematical operation. The correlation and/or assignment may in particular be a function, specifically a continuous or discontinuous function, a curve, a lookup table, an operator or any other means describing the correlation between the second brightness value and the third brightness value. As an example, the local tone map correction may comprise a mathematical relation between measured brightness values, such as the second brightness values, and the reference values, such as the known gray level of the gray reference fields. Specifically, the mathematical relation may be described by a parabolic approximation. Further, the local tone map correction takes into account the local brightness information derived in step iii). Thus, the local tone map correction specifically may be a mobile device-specific local tone map correction. As an example, by applying the local tone map correction to the second brightness values of the first intensity-corrected image, the third brightness values may be obtained, which specifically may be part of the second-intensity corrected image.

The term "taking into account the local brightness information" may simply refer to the fact that the local tone map correction takes into account the local brightness information derived in step iii). Thus, the local tone map correction is a correction which at least partially is based on the information derived in step iii), such as by determining one or more correction parameters of the local tone map correction on the basis of the local brightness information.

By applying the at least one local tone map correction to the first intensity-corrected image, at least one second intensity-corrected image is obtained. The term "second intensity-corrected image" as used herein is a broad term and is to be given its ordinary and customary meaning to a person of ordinary skill in the art and is not to be limited to a special or customized meaning. The term specifically may refer, without limitation, to image data obtained by applying the local tone map correction to the image data of the first intensity-corrected image obtained in step ii). Specifically, the second intensity-corrected image may be a linearized and intensity-corrected image. The term "second" as used therein is merely meant as a nomenclature, without providing a ranking or order.

As further outlined above, step v) comprises determining the analyte concentration based on a color formation reaction of the reagent test field. The term "color formation reaction" as used herein is a broad term and is to be given its ordinary and customary meaning to a person of ordinary skill in the art and is not to be limited to a special or customized meaning. The term specifically may refer, without limitation, to a chemical, biological or physical reaction during which a color, specifically a reflectance, of at least one element involved in the reaction, changes with the progress of the reaction. The color formation reaction may be detected by the mobile device, such as by a processor of the mobile device, and may be evaluated quantitatively, such as by deriving, from the at least one image, at least one parameter quantifying or characterizing the color formation of the reagent test field due to the presence of the analyte in the bodily fluid. As an example, one or more of the above-mentioned color coordinates may be used. Thus, the mobile device and specifically the processor of the mobile device may be configured for determining a color change by determining a change of one or more color coordinates taking place due to the detection reaction.

The at least one analyte concentration value is determined from the color formation of the reagent test field. For this purpose, the at least one second intensity-corrected image may be used. The analyte concentration value, as an example, may be a numerical value indicator of a result of the analytical measurement, such as indicative of the concentration of at least one analyte in the sample, such as a blood glucose concentration.

For determining the at least one analyte concentration value from the color formation of the reagent test field, as an example, at least one parameter may be derived from the reagent test field, such as at least one color formation parameter. Therein, and averaged parameter may be used, averaged over the entire reagent test field or over at least one region of the test field. For transforming the at least one parameter derived from the reagent test field into the analyte concentration, at least one predetermined or determinable transformation algorithm may be used. As an example, at least one predetermined or determinable relationship may be used for transforming the at least one parameter into the analyte concentration, such as at least one transformation function, e.g., a linear transformation function or a nonlinear transformation function. Additionally or alternatively, the relationship may be described by a transformation curve transforming the at least one parameter into the analyte concentration or by using at least one lookup table. Besides the at least one parameter derived from the color formation of the reagent test field, one or more other parameters may be used for determining the analyte concentration. Further, the transformation of the at least one parameter derived from the color formation of the reagent test field into the analyte concentration may be a one-step transformation or may be a multiple-step transformation.

The method of determining the concentration of at least one analyte in the sample of a bodily fluid may further comprise:
  vi) deriving, by using at least some of the color reference fields in the second intensity-corrected image, at least one color correction; and
  vii) applying the color correction to the second intensity-corrected image, thereby obtaining at least one intensity-corrected and color-corrected image.

Specifically, steps vi) and vii) may be performed after performing step iv). Further, the color correction may comprise at least one color correction matrix, wherein step vii) may comprise applying the color correction matrix to color coordinate vectors of the image. For example, the color correction matrix may be applied to the color coordinates of the second intensity-corrected image. For example, the color correction in step vii) may be applied to the second intensity-corrected image or any parts thereof, such as to the test field and/or other parts of the color reference card. Thus, steps vi) and vii) may specifically be performed after performing step iv) and before performing step v). Therefore, the determining of the analyte concentration in step v) may specifically take into account the intensity-corrected and color-corrected image.

The term "color correction" as used herein is a broad term and is to be given its ordinary and customary meaning to a person of ordinary skill in the art and is not to be limited to a special or customized meaning. The term specifically may refer, without limitation, to an algorithm for transforming at least one item of color information into another item of color information. Thus, specifically, the algorithm may contain an algorithm which at least partially attempts to reverse changes in the at least one item of color information introduced by optical and/or electronic components of a system, such as the camera and/or the mobile device. Consequently, the term "color-corrected image" as used herein generally may refer to the result of applying the color correction to at least one image, such as to the items of color information of the at least one image, specifically, in the present case, the second intensity-corrected image or any parts thereof, such as the test field.

The method may generally comprise one or more steps of white balancing. The white balancing specifically may be performed in one or more of the first intensity-corrected image obtained in step ii), the second intensity-corrected image obtained in step iv) or the intensity-corrected and color-corrected image obtained in optional step vii). Specifically, the white-balancing may be performed on a linearized image. More specifically, the white-balancing may be performed in step iv) and/or in combination or at least partially simultaneously with step iv) of the method, such as on the second-intensity corrected image. Specifically, the white balancing may be performed in the first intensity-corrected image obtained in step ii). The white balancing specifically may fully or partially be integrated into step iv) and/or the local tone map correction may imply at least one white balancing. Additionally or alternatively, the white balancing may fully or partially be implemented as a step separated from the local tone map correction, such as by implementing at least one separate step of white balancing, e.g., as separate white balancing steps or corrections steps for the color channels resulting in a white balancing. The second intensity-corrected image specifically may be a white-balanced second intensity-corrected image or may be replaced by a white-balanced second intensity-corrected image.

One or more white balancing steps may be performed. The white balancing may be or may comprise at least one global white balancing applied uniformly to the overall image. Additionally or alternatively, however, as will be outlined in further detail below, the white balancing may also be or may also comprise at least one local white balancing, taking into account non-uniformities within the image, such as color non-uniformities generated by inhomogeneous illumination of the color reference card and/or the optical test strip, e.g., non-uniformities generated by background illumination.

The method may further comprise, prior to step vi), a local white balancing of at least some of the color reference fields and of the test field, specifically of all of the color reference fields.

The term "white balancing," sometimes also referred to as "color balancing," "gray balancing" or "neutral balancing," as used herein is a broad term and is to be given its ordinary and customary meaning to a person of ordinary skill in the art and is not to be limited to a special or customized meaning. The term specifically may refer, without limitation, to an adjustment of the intensities of the colors in image processing, such as primary colors like red, green and blue. White balancing, as outlined in further detail below, may change the overall mixture of colors or correct the weight of the primary colors in an image and may be used for color correction. For white balancing, as will be outlined in further detail below, image data may be transformed from the acquired values to new values that are appropriate for color reproduction or display. The white balancing operations specifically may operate directly on the color coordinates such as on the R, G and B pixel values, such as by applying corrections, e.g., correction factors, to the color coordinates or R, G, B values. The white balancing may generally comprise adjusting the intensities of measured color coordinates. The white balancing may comprise at least one transformation of the measured color coordinates, for example, at least one transformation matrix and/or at least one transformation factor. The white balancing may transform measured color coordinates into white balanced color coordinates such that the white balanced color coordinates of a neutral color, for example, of a gray color and/or a white color, are neutral in the white balanced image. The white balancing may correct the measured color coordinates for inhomogeneous lighting conditions caused by different light sources having different light colors, for example, when ambient light interferes with a light source of the mobile device. The white balancing may specifically be a local white balancing. The local white balancing may take into account local variations of the intensity in the measured image, specifically local variations of the intensity of the color reference fields or the test field, respectively.

The term "local" in the context of the term "local white balancing" specifically may refer to the fact that the white balancing may be performed depending on the location in the image. Thus, specifically, there may be at least two different locations within the image, such as at least two different pixel positions, for which the white balancing is performed differently, such as by applying a first white balance correction for at least one of the color coordinates in a first position and a second white balance correction for at least one of the color coordinates in a second position, the second white balance correction differing from the first white balance correction. The term "position" or "location" as used herein may also refer to a group position, such as a group comprising a color reference field and the respective locally assigned gray reference fields, wherein the group may be treated, in the white balancing, as having a common position in the image. Similarly, the test field and the gray reference fields locally assigned to the test field may be treated as a group having one group position.

The local white balancing may comprise, for the color reference fields and the at least one test field subject to the white balancing, using the gray reference fields locally assigned to the respective color reference fields or the test field, respectively. Specifically, the local white balancing may comprise using the measured color coordinates of the gray reference fields locally assigned to the respective color reference fields or the test field, respectively. As will be outlined in further detail below, the gray reference fields locally assigned to the respective color reference fields or the test field, respectively, may comprise a plurality of redundant gray reference fields having at least three different gray levels. The local white balancing may take into account an average of measured color coordinates for the redundant gray reference fields. The measured color coordinates of redundant gray reference fields having the same gray level may be averaged in each of the R, G, B colors. The average of measured color coordinates for the redundant gray reference fields may be used for the local white balancing for deriving local corrections.

The redundant gray reference fields locally assigned to the respective color reference field or the test field, respectively, may surround the color reference field or the test field, respectively, in a symmetric fashion. By averaging over redundant gray reference fields, a virtual measured intensity of color coordinates at the position and/or at the center of the respective color reference field or the test field, respectively, may be obtained. The virtual measured intensity of color coordinates may be used for the local white balancing for deriving local corrections.

The local white balancing may comprise, for the color reference fields or the test field, respectively, subject to the white balancing, deriving local corrections, specifically local correction factors, for the respective color reference fields or the test field, respectively, by comparing measured color coordinates of the gray reference fields with known color coordinates of the gray reference fields. Specifically, by comparing measured color coordinates of the gray reference fields with known color coordinates of the gray reference fields, at least one local correction factor may be determined. The at least one local correction factor may describe a ratio between the measured color coordinates and the respective known color coordinates of the gray reference fields. The local correction factor specifically may be a color specific correction factor. For example, a local correction factor for each of the R, G, B colors, specifically independently, may be determined.

The local white balancing may further comprise applying the respective local corrections to measured color coordinates of the respective color reference fields or the test field, respectively. For example, the local correction factors, specifically one for each of the R, G, B color, may be applied to the respective measured color coordinates of the respective color reference fields or the test field, respectively.

For performing step vi), the second intensity-corrected image may be replaced by a locally white-balanced second intensity-corrected image. The color correction in step vi) may be derived from the locally white-balanced second intensity-corrected image. The color correction may be applied in step vii) to the locally white-balanced second intensity-corrected image, thereby an intensity-corrected, color-corrected and white balanced image may be obtained. The determining of the analyte concentration in step v) may specifically take into account the intensity-corrected, color-corrected and white balanced image.

In step vi), the color correction may be derived by using a selection of the color reference fields. The selection of the color reference fields may be based on at least one of:
  selecting color reference fields in a predetermined subspace of the color space;
  dynamically selecting color reference fields in an environment of the color of the test field in the color space;
  weighting color reference fields differently, specifically by giving color reference fields having a color close to the color of the test field a higher weight than color reference fields being further away from the color of the test field in the color space;
  selecting color reference fields in accordance with an accuracy of the color correction, specifically an accuracy determined by cross-validating color reference fields;
  selecting one set of color reference fields of at least two redundant sets of color reference fields in accordance with the accuracy of the color correction, specifically by omitting the redundant set of color reference fields having a low accuracy of the color correction.

As outlined above, the method comprises in step ii), applying the pixel-based mean tone map correction to the image obtained in step i). The pixel-based mean tone map correction may comprise at least one of: a mean tone map correction derived by combining a plurality of tone map corrections for different types of mobile devices; an inverse of a standard Gamma correction. Specifically, the mean tone map correction may be derived by averaging the plurality of tone map corrections for the different types of mobile device.

The method may further comprise selecting at least one area of interest from the at least one image captured in step i), wherein step ii) may be performed on the basis of the area of interest. The term "area of interest" as used herein is a broad term and is to be given its ordinary and customary meaning to a person of ordinary skill in the art and is not to be limited to a special or customized meaning. The term specifically may refer, without limitation, to a part of an image which is used for further processing. This election of the area of interest from the at least one image may take place manually or, specifically, automatically, such as by automatically detecting, in the image, the area of interest. For detecting, specifically automatically detecting, image recognition software may be used, such as image recognition software detecting specific shapes and/or other image recognition software, such as artificial intelligence. The area of interest may specifically comprise at least part of the reagent test field and at least part of the color reference card. Specifically, the area of interest may be determined by at least one of: at least one position marker visible in the image, specifically at least one ArUco code marker; image recognition for detecting at least one feature in the image, specifically image recognition for detecting an area of the color reference card comprising the gray reference fields and the color reference fields.

Further, the method may comprise, specifically before performing step iv), performing at least one statistical modification of the first intensity-corrected image, wherein step iv) may be performed on the basis of the statistically modified first intensity-corrected image. The term "statistical modification" as used herein is a broad term and is to be given its ordinary and customary meaning to a person of ordinary skill in the art and is not to be limited to a special or customized meaning. The term specifically may refer, without limitation, to an operation applying at least one statistical algorithm to a set of data, such as image data. The statistical algorithm may, as an example, comprise at least one algorithm selected from the group consisting of: a histogram analysis of the data, and averaging of the data, a filtering of the data. As an example, the statistical modification may comprise creating histograms for the gray reference fields, the color reference fields and the test field visible in the first intensity-corrected image. Further, the statistical modification may comprise evaluating the created histogram by at least one of: excluding outliers, specifically outliers lying in the periphery of the histogram; filtering color values, such as color values above and/or below a certain threshold; checking the plausibility of the histogram; subjecting the histogram to a failsafe algorithm; calculating a property of the histogram, such as a mean value, a deviation, specifically a standard deviation, or the like.

Specifically, for the gray reference fields, the color reference fields and the test field visible in the first intensity-corrected image, pixel-based image information may be replaced by representative information, specifically by average information, for the gray reference fields, the color reference fields and the test field, respectively.

As outlined above, the method comprises in step iv), applying the local tone map correction to the first intensity-corrected image. As an example, the local tone map correction may be a mobile device-specific individual tone map correction. Thus, the local tone map correction may be determined for individual mobile devices or for groups of individual mobile devices, thereby taking into account device specific properties of the mobile devices, such as the individual image transformation characteristics of the mobile devices. The determining of the local tone map correction may be part of the method. Consequently, the determining of the mobile device-specific individual tone map correction may be performed for the specific mobile device currently in use for the method.

As outlined above, the color reference card may comprise gray reference fields locally assigned to the test field. The gray reference fields locally assigned to the test field may surround the test field. Thus, the gray reference fields locally assigned to the test field and the test field may form a test field group. The test field group may comprise a plurality of redundant gray reference fields having at least three different gray levels, wherein at least two redundant gray reference fields may be provided for each gray level. For example, the plurality of redundant gray reference fields may comprise at least three different gray reference fields having different gray levels. Alternatively and/or additionally, the redundant gray reference fields may comprise at least one gray reference field having a gradient of gray levels or different sections with at least three different gray levels. Specifically, the redundant gray reference fields may be arranged around the test field in a symmetric fashion, more specifically in a rotationally symmetric and/or a mirror symmetric fashion. As an example, in step iii), the local brightness information for the test field may be determined by averaging over redundant gray reference fields having the same gray level. Specifically, the local brightness information may be determined by averaging over redundant gray reference fields with respect to a distance of the gray reference field to the test field. For example, the averaging may comprise weighting the color values of redundant gray reference fields with their reciprocal quadratic distance to the test field. Alternatively or additionally, the averaging may comprise averaging each of the RGB color values separately.

Further, the test field group may share at least some of the gray reference fields with at least one neighboring local color reference field group. Thus, the gray reference fields assigned to the test field group may also be assigned to at least one neighboring local color reference field group.

As further outlined above, the color reference card may comprise gray reference fields locally assigned to the color reference fields. The gray reference fields locally assigned to the color reference fields may surround the respective color reference fields. Thus, the gray reference fields locally assigned to one of the color reference fields and the respective color reference field may form a local color reference field group. Each local color reference field group may comprise a plurality of redundant gray reference fields having at least three different gray levels, wherein at least two redundant gray reference fields may be provided for each gray level. Specifically, the redundant gray reference fields may be arranged around the color reference field of the respective local color reference field group in a symmetric fashion, more specifically in a rotationally symmetric and/or a mirror symmetric fashion. As an example, in step iii), the local brightness information for the respective local color reference field group may be determined by averaging over redundant gray reference fields having the same gray level. Specifically, the local brightness information may be determined by averaging over redundant gray reference fields with respect to a distance of the gray reference field to the respective color reference field. For example, the averaging may comprise weighting the color values of redundant gray reference fields with their reciprocal quadratic distance to the color reference field. Alternatively or additionally, the averaging may comprise averaging each of the RGB color values separately.

Further, at least some of the gray reference fields may be shared by neighboring local color reference field groups and/or by the test field group and at least one local color reference field group. Thus, a gray reference field locally assigned to the local color reference field group may also be assigned to the neighboring local color reference field group and/or to the test field group.

The color reference card may further contain at least one positioning element for positioning the optical test strip and/or the test field. Specifically, the color reference card may comprise at least one window element through which the test field is visible when the test strip is placed behind the color reference card. For example, the window element may be a cut-out portion of the color reference card. The window element may specifically be configured for keeping the optical test strip and, thus, the test field comprised by the optical test strip, in the defined position with respect to the color reference card.

As outlined above, the method comprises using the mobile device having the at least one the camera to capture the at least one image. As an example, the capturing of the at least one image in step i) may be initiated automatically by the mobile device, specifically when at least one of the color reference card, the test field and the optical test strip may be recognized by the mobile device. Thus, the mobile device may be configured for automatically recognizing at least one of the color reference card, the test field and the optical test strip in the field of view, as outlined in further detail above.

The method may further comprise prompting the user to place the color reference card and at least one of the optical test strip and the test field in the field of view of the camera. Specifically, the method may comprise prompting the user by displaying a message on a display of the mobile device. Additionally or alternatively, the prompting may comprise displaying one or more of a reference card overlay frame, a picture, a pictogram and/or an animation on the display of the mobile device.

The method may comprise, specifically after step i), performing a validity check with at least one of a color reference field, a gray reference field and the reagent test field. The term "validity check" as used herein is a broad term and is to be given its ordinary and customary meaning to a person of ordinary skill in the art and is not to be limited to a special or customized meaning. The term specifically may refer, without limitation, to a process of qualitatively or quantitatively evaluating a suitability of image data of a field of the color reference card, specifically of at least one of a color reference field and a gray reference field, and/or of the reagent test field of the optical test strip for being used in the method according to this disclosure. The validity check may comprise evaluating the image of the color reference card and the reagent test field captured in step i). Specifically, the validity check may comprise evaluating if the image of the color reference card and the test field is at last partially disturbed by specular reflections causing oversaturated and/or overexposed regions in the image. The validity check may specifically be performed with the color reference fields and gray reference fields, more specifically with each of the color reference fields and gray reference fields, comprised by the color reference card and/or with the reagent test fields, more specifically with each of the reagent test fields, comprised by the optical test strip.

The validity check may comprise determining at least one color value, specifically the color values R, G, B for each pixel, for the color reference field, the gray reference field and/or the test field from the at least one image captured in step i). The validity check may comprise determining, based on the at least one color value, if at least one validity criterion on the color reference field, the gray reference field and/or the test field is fulfilled. The term "validity criterion" as used herein is a broad term and is to be given its ordinary and customary meaning to a person of ordinary skill in the art and is not to be limited to a special or customized meaning. The term specifically may refer, without limitation, to an item of information qualifying and/or quantifying the validity of the color reference field, the gray reference field or the test field. Thus, as an example, if the color value for the color reference field, the gray reference field and/or the test field has at least one predetermined value or is within at least one predetermined value range, the validity criterion may be fulfilled, whereas, if the color value for the color reference field, the gray reference field and/or the test field does not have the at least one predetermined value or does not lie within the at least one predetermined value range, the validity criterion may not be fulfilled. The validity criterion may indicate the validity of the color reference field, the gray reference field and/or the test field, such as by using one or more numerical values and/or by using one or more Boolean values and/or one or more digital values, such as "fulfilled" and "not fulfilled" or the like. As an example, in case the color value for the color reference field, the gray reference field and/or the test field is above or below a predetermined threshold value, the validity criterion may be set to a specific value. For example, one or more threshold values may be used, wherein, in case the color value for the color reference field, the gray reference field and/or the test field is above the threshold value, the validity criterion may be set to "not fulfilled," otherwise "fulfilled" or vice versa. The one or more threshold values may vary for the color reference field, the gray reference field and/or the test field, respectively.

The validity criterion may be at least one of a direct validity criterion and an indirect validity criterion. The direct validity criterion may refer to a direct measure of the respective color reference field, gray reference field and/or test field. Alternatively or additionally, the validity criterion may comprise the indirect validity criterion evaluating the gray reference fields surrounding at least one of the color reference field and the test field thereby describing the validity of the surrounded color reference field and/or the test field.

For example, the direct validity criterion may comprise an upper threshold, wherein the color reference field, the gray reference field and/or the test field is classified as "oversaturated" if at least one of its color values is above the upper threshold. The validity criterion may be set to "not fulfilled" if the color reference field, the gray reference field and/or the test field are classified as "oversaturated." The upper threshold may be 253, specifically 254, more specifically 255. As another example, the direct validity criterion may comprise a medium threshold, wherein the gray reference field is classified as "overexposed" if a mean value of the color values of the gray reference field is above the mean threshold. The validity criterion of the gray reference field may be set to "not fulfilled" if the gray reference field is classified as "overexposed." The mean threshold may be dependent on the gray level of the gray reference field. Specifically, the mean threshold may be in the range of from 200 to 255, specifically in the range of from 240 to 250, more specifically of 245, for light gray reference fields and/or for medium gray reference fields. Additionally or alternatively, the mean threshold may be in the range of from 150 to 200, specifically in the range of from 165 to 175, more specifically 170, for medium gray reference fields and/or for dark gray reference fields. Additionally or alternatively, the mean threshold may be in the range of from 50 to 100, specifically in the range of from 80 to 90, more specifically 85 for dark gray reference fields. As another example, the direct validity criterion may comprise a variation coefficient, wherein the color reference field, the gray reference field and/or the test field is classified as "inhomogeneous" if the variation coefficient is above a threshold of 0.1, specifically of 0.2, more specifically 0.3. The validity criterion may be set to "not fulfilled" if the color reference field, the gray reference field and/or the test field are classified as "inhomogeneous." The variation coefficient may be determined by a ratio of a standard deviation of color values of a plurality of pixels in the image describing the color reference field, the gray reference field and/or the test field, respectively, and a mean value of these color values.

For example, the indirect validity criterion may comprise a relative intensity threshold. The relative intensity threshold may be applied to the gray reference fields locally assigned to the color reference field and/or the test field. In case a relative difference in gray levels between gray reference fields having the same known gray levels exceeds the relative intensity threshold of 40%, specifically of 50%, the validity criterion of the surrounded color reference field and/or test field may be set to "not fulfilled." As another example, the indirect validity criterion may comprise a ratio between gray reference fields of dark gray level and gray reference fields of medium gray level. In case a ratio of the gray level of the gray reference fields of dark gray level and the gray level of the gray reference field of medium gray level is within an interval of from 0 to 0.8, specifically within an interval of from 0.1 to 0.7, more specifically within an interval of from 0.2 to 0.6, the validity criterion of the surrounded color reference field and/or test field may be set to "fulfilled." As another example, the indirect validity criterion may comprise a ratio between gray reference fields of medium gray level and gray reference fields of light gray level. In case a ratio of the gray level of the gray reference fields of medium gray level and the gray level of the gray reference field of light gray level is within an interval of from 0 to 0.9, specifically within an interval of from 0.1 to 0.8, more specifically within an interval of from 0.2 to 0.75, the validity criterion of the surrounded color reference field and/or test field may be set to "fulfilled."

Further, if the validity criterion is fulfilled, the color reference field, the gray reference field and/or the test field may be flagged as valid. However, if the validity criterion is not fulfilled, the color reference field, the gray reference field and/or the test field may be flagged as invalid. Color reference fields, gray reference fields and/or test fields being flagged as valid may be subjected to step ii) of the method. In other words, color reference fields, gray reference fields and/or test fields being flagged as invalid may be excluded from further processing. In case a certain number of color reference fields, gray reference fields and/or test fields, e.g., 2 or more, 5 or more, or 10 or more, such as from 2 to 20, or from 2 to 10, particularly a certain number of color reference fields, e.g., 1 or more, 2 or more, 3 or more, 4 or more, or 5 or more, specifically 2 or more, or 3 or more, and/or a relative number of at least 10%, 15%, 20%, 25% or 30%, particularly at least 20% or at least 25%, of color reference fields, gray reference fields and/or test fields, particularly of color reference fields, are flagged as invalid, the method may comprise repeating step i), such as by automatically capturing an image with the camera and/or by prompting the user to capture an image. Otherwise, the method may proceed with step ii).

In a further aspect of this disclosure, a mobile device is disclosed, the mobile device having at least one camera and the mobile device being configured for performing the method according to this disclosure, such as according to any one of the embodiments dis-closed above and/or according to any one of the embodiments disclosed in further detail below. Specifically, the mobile device may comprise at least one processor.

The term "processor" as used herein is a broad term and is to be given its ordinary and customary meaning to a person of ordinary skill in the art and is not to be limited to a special or customized meaning. The term specifically may refer, without limitation, to an arbitrary logic circuitry configured for performing basic operations of a computer or system, and/or, generally, to a device which is configured for performing calculations or logic operations. In particular, the processor may be configured for processing basic instructions that drive the computer or system. As an example, the processor may comprise at least one arithmetic logic unit (ALU), at least one floating-point unit (FPU), such as a math coprocessor or a numeric co-processor, a plurality of registers, specifically registers configured for supplying operands to the ALU and storing results of operations, and a memory, such as an L1 and L2 cache memory. In particular, the processor may be a multi-core processor. Specifically, the processor may be or may comprise a central processing unit (CPU). Additionally or alternatively, the processor may be or may comprise a microprocessor, thus specifically the processor's elements may be contained in one single integrated circuitry (IC) chip. Additionally or alternatively, the processor may be or may comprise one or more application-specific integrated circuits (ASICs) and/or one or more field-programmable gate arrays (FPGAs) or the like.

The processor specifically may be configured, such as by software programming, for per-forming and/or supporting the method steps of the method of determining the concentration of an analyte in a sample of a bodily fluid. Specifically, the processor may be configured for supporting the capturing of the at least one image of the at least one part of the optical test strip having the test field and of the at least one part of the color reference card by using the camera. The processor may further be configured for determining at least one analyte concentration value from the color formation reaction of the test field, such as by evaluating the image, deriving the at least one parameter on the color formation from the image and by transforming the at least one parameter into the at least one analyte concentration value. The processor specifically may further be configured for supporting one or more or all of steps i), ii), iii), iv) and v) of the method, such as for applying the at least one predetermined pixel-based mean tone map correction to the captured image, such as for deriving the local brightness information and for applying the at least one local tone map correction. The processor may further be configured for performing and/or supporting the method steps vi) and vii), such as by deriving the at least one color correction and applying the color correction to the intensity-corrected image.

The processor may further be configured for supporting sample application to the optical test strip, such as by providing user guidance, e.g., in a visual format and stuff or in an audible format. The processor may further be configured for supporting the capturing of the at least one image, e.g., by automatically detecting the optical test strip, the color reference card and the test field or parts thereof in a field of view and/or by prompting the user to capture the image.

Further, the mobile device may comprises at least one light source, wherein the mobile device may be configured for illuminating the color reference card and the test field during capturing the image in step i). As an example, the second intensity-corrected image is an image corrected for inhomogeneities of the illumination by the light source.

The term "light source" as used herein is a broad term and is to be given its ordinary and customary meaning to a person of ordinary skill in the art and is not to be limited to a special or customized meaning. The term specifically may refer, without limitation, to an arbitrary device configured for emitting light, such as one or more of light in the visible spectral range, the light in the infrared spectral range or light in the ultraviolet spectral range. Specifically, the light source may be configured for emitting light in the visible range, e.g., light having a wavelength of 380 nm to 760 nm. More specifically, the light source may be configured for simultaneously emitting light having different wavelength, such that the light source may be configured for emitting white light. As an example, the light source may be or may comprise at least one light emitting diode. Other options, however, are also feasible.

In a further aspect of this disclosure, a kit for determining the concentration of at least one analyte in a sample of a bodily fluid is disclosed. The kit comprises at least one optical test strip having at least one reagent test field and further at least one color reference card, wherein the color reference card comprises a plurality of different gray reference fields locally assigned to the test field, and wherein the color reference card comprises a plurality of different color reference fields having known reference color values and a plurality of different gray reference fields locally assigned to the color reference fields.

The term "kit" as used herein is a broad term and is to be given its ordinary and customary meaning to a person of ordinary skill in the art and is not to be limited to a special or customized meaning. The term specifically may refer, without limitation, to a combination of at least two items which might as an example, may be supplied conjointly in a package, which may interact in order to fulfill at least one common purpose.

In a further aspect of this disclosure, a computer program is disclosed, the computer program comprising instructions which, when executed by a mobile device having a camera, specifically by the mobile device according to this disclosure, such as according to any one of the embodiments disclosed above and/or according to any one of the embodiments disclosed in further detail below and/or by the mobile device of the kit according to this disclosure, such as according to any one of the embodiments disclosed above and/or according to any one of the embodiments disclosed in further detail below, cause the mobile device to carry out the method according to this disclosure, such as according to any one of the embodiments disclosed above and/or according to any one of the embodiments disclosed in further detail below.

In a further aspect of this disclosure, a computer-readable storage medium is disclosed, the computer-readable storage medium comprising instructions which, when executed by a mobile device having a camera, specifically by the mobile device according to this disclosure, such as according to any one of the embodiments disclosed above and/or according to any one of the embodiments disclosed in further detail below and/or by the mobile device of the kit according to this disclosure, such as according to any one of the embodiments disclosed above and/or according to any one of the embodiments disclosed in further detail below, cause the mobile device to carry out the method according to this disclosure, such as according to any one of the embodiments disclosed above and/or according to any one of the embodiments disclosed in further detail below.

As used herein, the term "computer-readable storage medium" specifically may refer to a non-transitory data storage means, such as a hardware storage medium having stored there-on computer-executable instructions. The computer-readable data carrier or storage medium specifically may be or may comprise a storage medium such as a random-access memory (RAM) and/or a read-only memory (ROM).

The computer program may also be embodied as a computer program product. As used herein, a computer program product may refer to the program as a tradable product. The product may generally exist in an arbitrary format, such as in a paper format, or on a computer-readable data carrier and/or on a computer-readable storage medium. Specifically, the computer program product may be distributed over a data network.

The methods and devices according to this disclosure provide a large number of advantages over similar methods and devices known in the art. Specifically, the method and devices as described herein may particularly be advantageous due to its high flexibility and usability. For example, the method and devices may allow for brightness correction taking into account both smartphone-independent as well as device-specific aspects. Therefore, the method of determining the concentration of an analyte in a sample of a bodily fluid may be used for a wide variety of different models of mobile devices. Additionally, the brightness correction, specifically taking into account device-specific as well as local variations, may enable a reliable subsequent color correction.

Further, the present method and devices, e.g., by using the color reference card and the color correction, may increase the accuracy of the analytical measurement. Specifically, using the color reference card according to this disclosure may allow the color correction of the color formation reaction of the test field and, thus, may reduce the effect of various influencing factors, such as inhomogeneous lighting conditions, on the analytical measurement. Thus, the method and devices according to this disclosure may increase measurement safety over known methods and devices.

The method specifically may improve existing methods of determining an analyte concentration based on color formation reagent test fields and color reference cards by applying, firstly, a double-corrected intensity correction and, subsequently, by applying a color correction.

Thus, in order to determine the color of a given part of an image accurately, firstly the intensity, also referred to as the brightness, of that part of the image may be corrected with reference to a common standard. The brightness of a specific area of the recorded image may be determined not only by the color and brightness of the recorded object itself, such as the optical test strip or a reference color field on the reference card, but also by multiple other factors, such as the brightness of the illuminating light source, the shutter speed and aperture size, the sensitivity of the sensors, sensor gains, and any digital post-processing steps. The observed brightness in the recorded image, which may be subject to all these factors, may also be referred to as "apparent brightness."

The brightness of the different fields of the color reference card may be known, such as by having measured the brightness under standard conditions, e.g., using a photospectrometer. This brightness may also be referred to as the "object brightness" or "reference brightness."

The goal of the brightness correction may be to deduce the true object brightness from the apparent brightness recorded in the image. The apparent brightness may vary spatially, mainly due to inhomogeneous illumination conditions. Thus, brightness correction typically cannot be performed for the image as a whole, but has to be calculated locally.

The response of the color values, such as the RGB-Values, in an image recorded with a mobile device camera, such as a smartphone camera, to variations of the illumination strength on the camera sensor typically is given by a non-linear tone-mapping curve. This tone-mapping curve typically is device dependent and may also vary depending on the recorded scenery. It typically has to be determined for each recorded image individually.

In the method according to this disclosure, the apparent brightness of the image in the area of the reference card may be measured using gray reference fields, also referred to as gray color patches, having different gray values, which may be distributed over the color reference card. Each color reference field may be surrounded by a plurality of gray reference fields, such as twelve gray fields, e.g., for gray reference fields in light gray, four gray reference fields in medium gray and four gray reference fields in light gray. Similarly, a plurality of gray reference fields may be locally assigned to the at least one test field. Thus, as an example, a position of the color reference card in which the test field is visible may be surrounded by a plurality of gray reference fields, such as eighteen gray reference fields, e.g., having six gray reference fields for each gray shade. Three different gray level values or gray shades, such as 20%, 40%, and 60%, may be used to account for the non-linear tone-mapping curves used by the different types of mobile devices, such as the different smartphone models.

For the intensity correction, specifically the intensity correction by using the at least one local tone map correction, values may be derived from the gray reference fields under standard conditions. Thus, as an example, reference RGB-values of the three gray fields under standard conditions may be measured at high accuracy, such as using a photospectrometer, e.g., an X-Rite Exact photospectrometer such as available by X-Rite GmbH, 82152 Planegg-Martinsried, Germany or another type of photospectrometer. These values may be used as common reference for the brightness correction of the color reference fields and the test field.

The apparent local image brightness in the recorded image may be determined for all color reference field locations and for all test field locations, as well as for all three gray reference fields, e.g., by calculating the average measured RGB-values of the closest gray reference fields of the respective gray shades. For color reference fields, in the example given above, this calculation may include four gray reference fields for each gray shade, whereas, for the test field, six fields may be included per gray shade. When calculating the average, the values of the individual gray reference fields may be weighted with their reciprocal quadratic distance, such as center-to-center, to the respective color reference field or test field. The values may be calculated separately for each color channel, such as for R, G and B channels separately.

As result, the procedure may yield an approximation of the apparent RGB values of the three reference gray values in the recorded picture at the center locations of all reference color fields and the test fields. These values may be used to calculate approximate tone-mapping curves for these locations as described in further detail below.

Further details may refer to the tone-mapping, specifically a non-linear tone-mapping. Thus, when converting pixel-related brightness values of an image acquisition sensor into brightness values in an image file, mobile device cameras such as smartphone cameras typically make use of a non-linear transfer function that compresses the brightness dynamics. The reasons for the application of such a non-linear transfer function are manifold. Often, esthetic reasons are given. Still, other reasons such as the need for dynamic compression are also important. As discussed above, the transfer function applied by the mobile device is typically referred to as the tone-mapping curve. It establishes a relationship between a pixel brightness measured on a linear scale and the brightness value stored in an image file for that pixel. A well-known form of a tone-mapping curve, which may also be used for the predetermined pixel-based mean tone map correction in step ii), is the gamma correction defined by the sRGB color space. It reflects the non-linear brightness reproduction of classical tube monitors, which in turn are oriented to the non-linear brightness perception of the human eye. A desirable side effect is the better utilization of brightness dynamics in an image data format with limited dynamics, e.g., the 8-bit dynamic range in JPEG image format. If a linear tone-mapping curve were used in step ii), the brightness doubling from brightness value 1 to 2 would be resolved in one step, while the doubling from 128 to 255 would be resolved with 127 steps. Since the human eye perceives brightness on a logarithmic scale, both doublings represent approximately the same increase in brightness. With gamma correction, a non-linear tone mapping curve may be used to ensure that all brightness doubles can be resolved with approximately the same number of steps. It shall be noted, however, that, additionally or alternatively, other predetermined pixel-based mean tone map corrections may be used for step ii), specifically for all of the pixels of the image obtained in step i).

In the mobile device and/or in the camera thereof, the brightness data supplied by the image sensor are usually converted using a non-linear tone-mapping curve. In most cases, however, these curves do not correspond exactly to the gamma correction defined by the s-RGB standard, but their non-linearity often goes beyond this curve shape. The reason for this might be a better subjective image impression. In principle, each color channel is calculated separately with its own tone mapping curve, but, in practice, the curves for the three color channels where found to be identical for all investigated smartphone models. For this reason, no explicit reference is made to individual color channels in the following.

If a quantitative measurement of colors and color brightness is to be performed with a mobile device camera, then a non-linear tone mapping curve typically poses a problem, since a linear relationship between the pixel brightness stored in the image and the measured brightness value is typically required for measurement purposes. Therefore, the brightness on a linear common scale generally may have to be reconstructed as will be described in the following.

In the context of the present application, the tone-mapping curves of different smartphone models were measured by taking pictures of a high-accuracy gray wedge and evaluating the pixel values in the images. Examples will be shown in the embodiment section below. The tone-mapping curves turned out to be strongly non-linear. The nonlinearity of the curves was approximated using an empirical formula f(x):

$$f(x) = 0 \text{ for } x \leq x_0,$$

$$f(x) = 255 \text{ for } x \geq x_1, \text{ and}$$

$$f(\tilde{x}) = 255 \cdot \left[ (1-\alpha) \cdot \tilde{x}^{\frac{1}{\gamma}} + a \cdot \frac{1}{\log(\beta+1)} \log(\beta\tilde{x}+1) \right] \text{ and } \tilde{x} =$$

$$\frac{x - x_0}{x_1 - x_0} \text{ for } x_0 < x < x_1$$

The parameters $x_0$, $x_1$, $\alpha$, $\beta$ and $\gamma$ are fitting parameters that are tuned to approximate the tone-mapping curves of the different smartphones. The exact shape of the tone-mapping curve typically depends on the type of the mobile device, such as the smartphone model, and possibly on recording conditions of the image.

Thus, in step ii), a at least one predetermined pixel-based mean tone map correction may be applied to the image obtained in step i), such as one of the tone map corrections described above. The predetermined pixel-based mean tone map correction may be determined empirically, such as by measuring tone map corrections of a plurality of mobile devices, semi-empirically or theoretically. Thus, based on the assumption that many tone map corrections make use of the well-known gamma function, this standard tone map correction may be applied in step ii). Still, as mentioned above, other tone map corrections may be used.

For correcting the intensity or brightness of the image obtained in step i), ideally, the inverse of the tone-mapping curve which previously was applied by the mobile device to create the image should be applied to the image, thereby reversing them if occasions introduced by the mobile device. Thus, ideally, the brightness of the image may be corrected using the inverse of the exact tone-mapping curve which has been used to create the image. In practice, however, this is generally not feasible, given the huge variety of mobile devices on the market and the resulting variety of tone-mapping curves.

Thus, as disclosed above, this disclosure therefore proposes a two-step correction, comprising correction steps ii) and iv). Thus, in step ii), as discussed above, firstly, at least one predetermined pixel-based mean tone map correction to the image obtained in step i), thereby obtaining at least one first intensity-corrected image. This predetermined pixel-based mean tone map correction may be, as an example, a correction using the inverse of an average tone-mapping curve. As discussed above, this average tone-mapping curve may be, as an example, a standard gamma correction curve or an average tone-mapping curve empirically determined by analyzing the behavior of a plurality of mobile devices. This average tone-mapping curve used in step ii) specifically may be independent of the type of mobile device. This procedure may correct the major part of the non-linearity, but typically cannot compensate the difference in tone-mapping curves used in different devices.

This first correction step ii), as discussed above, results in at least one first intensity-corrected image. It is proposed to further correct this first intensity-corrected image, such as in order to compensate for individual differences in tone-mapping curves used in different devices. This additional correction step is described in step iv).

For further correcting the at least one first intensity-corrected image, the resulting image or curve derived thereof may be, as an example, approximated with a parabolic approximation of the three apparent gray field values, determined as described above, as a function of their reference values. The remaining non-linearity of this relation may, thus, be approximated by the quadratic term of the parabola. The RGB values of the color reference fields and test fields can be brought to a common linear scale by first applying the inverse average tone-mapping curve as a pre-determined pixel-based mean tone map correction and subsequently applying the inverse of the parabolic approximation, as a local tone map correction.

As outlined above, in step ii), at least one predetermined pixel-based mean tone map correction is applied to the image obtained in step i). As an example, the tone-mapping curves of ten different smartphones were been measured. The average of all measured curves was determined. Although the general curve shape was found to be roughly the same, different smartphone models turned out to show different tone-mapping curves.

Thus, for the first correction step ii), the inverse of the device-independent average tone-mapping curve may be applied to the measured image, such as to the RGB-values of the image. The correction typically removes the major part of the non-linearity, but the difference between the mobile device models usually remains. This remaining non-linearity may be approximated, such as by a parabolic fit of the measured RGB Values of the three gray field values. Thus, as an example, for each color channel and each color reference field or test field, the three values may firstly be corrected using the average curve, then the relation between the measured values and the tabulated reference values may be approximated by a parabola.

The quality of the approximation of the tone-mapping curves can generally be evaluated by comparing the result of a forward calculation of both approximation and correction steps to the original measured tone-mapping curve. Thereby, the result of the intensity correction may generally be verified in a rather simple fashion.

Further comments may be made on the white-balancing in the context of this disclosure. The term "white-balancing" generally refers to the adjustment of the primary color channels in a way that neutral colors, such as white and gray, appear neutral in the image. White-balancing may implicitly be included in the method according to this disclosure. Thus, each primary color channel may be linearized in a way that it reproduces the reference values for the three gray shades of the gray reference fields. Since the reference RGB-values of these fields generally are neutral, such as gray, the linearized RGB values of these gray reference fields typically also are neutral, which means that they are identical to the reference values. Thus, the linearization includes "white-balancing" calibrated on three different neutral colors.

The method according to this disclosure comprises the two-step tone map correction, including the predetermined pixel-based mean tone map correction and the local tone map correction. Generally and typically, as basic information in color reference card production, precise colorimetric and/or photometric values for all color reference fields and gray reference fields will have to be have to be defined, for example, as mean and/or median values. For the two-step intensity correction, the first step, specifically before performing any color correction, typically is to perform an intensity correction for the image recorded. Essentially the intensity correction typically can be regarded as a two-step process with the focus on so-called tone map correction. In the first correction step ii), as explained above, including the predetermined pixel-based mean tone map correction, a generic and typically mobile device independent smartphone independent global correction on a pixel basis may be performed, such as accounting for the average "tone map curve" applied by average mobile devices. In a second correction step iv), as also outlined above, including the local tone map correction, a mobile-device-specific histogram-based or statistical value-based local tone map correction or another type of local tone map correction may be applied. As an example, the local tone map correction could be also color channel-specific. This local tone map correction may not only include the individual mobile device tone mapping effect but also includes the local intensity. For this purpose, the gray reference fields may be used.

As outlined above, in the method, a "true object brightness" or "true object intensity," such as measured in production, may be deduced from the apparent brightness, such as recorded in the field. In the method, firstly, at least one an image of the reference card may be recorded. As an optional step, the recorded image may be further cropped to, e.g., the inner region span, such as by using one or more positional markers, e.g., by using ArUco codes.

The method comprises applying at least one predetermined pixel-based mean tone map correction to the image in step ii). This predetermined pixel-based mean tone map correction may be a pixel-based first intensity correction step by using an average tone map curve.

Further, the method may, e.g., in step iii), comprise identifying the color reference fields and/or the gray reference fields. This identification may comprise determining the geometric position and/or the pixel position of the color reference fields and/or the gray reference fields, specifically of all color reference fields and/or the gray reference fields.

Further, as outlined above, at least one statistical modification of the first intensity-corrected image may be performed. Specifically, the statistical modification may comprise creating histograms for the gray reference fields, the color reference fields and the test field visible in the first intensity-corrected image. As an example, histograms may be created, and further statistical values for all color channels, e.g., R, G and B, may be derived.

In a further method step, step iii), from the first intensity-corrected image, local brightness information is derived for at least some of the color reference fields and for the test field, by using the gray reference fields locally assigned to the color reference fields and the test field, respectively. Specifically, the apparent local image brightness for all color reference fields and the test field location may be determined, such as by calculating the average RGB values of the closest grey reference fields.

Further, the second step, step iv), of the intensity correction is performed. As outlined above, this second correction step specifically comprises applying at least one local tone map correction to the first intensity-corrected image, the local tone map correction taking into account the local brightness information, thereby obtaining at least one second intensity-corrected image. Thus, specifically, a mobile device-specific tone map correction may be carried out.

As further outlined above, in addition to the two-step intensity correction, at least one color correction may be applied to the image, specifically subsequently to the intensity correction, i.e., to the second intensity-corrected image. Thus, correction generally may comprise deriving, by using at least some of the color reference fields in the second intensity-corrected image, at least one color correction (step vi)) and, further, applying the color correction to the second intensity-corrected image, thereby obtaining at least one intensity-corrected and color-corrected image (step vii)). In this color correction, generally, the true object color, such as measured in production, may be deduced from the apparent color, such as recorded in the field. The color correction generally may be based on the second intensity-corrected image, specifically the linearized and intensity-corrected image. The color reference fields may be represented as RGB means, e.g., by disregarding the gray reference fields. In step vi), specifically, a sub-set may be selected, e.g., from all color reference fields. The selection of the at least one color reference field, as an example, may be based on one or more of:

a best match, such as in raw count of one or more color values, such as R count, with the test field, or a cross validation, such as by fitting a color correction, e.g., a Color Correction Matrix (CCM), with all but one color reference field and determining those with the lowest performance when corrected.

Other options for a selection may be possible.

The color correction, in step vi), may be derived by using at least some of the color reference fields in the intensity-corrected image, e.g., the color reference fields of the selection described above. As an example, a Color Correction Matrix may be derived by fitting the sub-set of color reference fields.

After deriving the color correction, such as the Color Correction Matrix, a quality check of the result, i.e., a quality check of the color correction, may be performed. As an example, a fit residuum of a Color Correction Matrix may be derived, and, optionally, a second cross validation with the set of used color reference fields may be performed. Thereby a quality of the result of step vi) may be determined.

Further, in step vii), as discussed above, the color correction is applied to the second intensity-corrected image, thereby obtaining at least one intensity-corrected and color-corrected image. Thus, as an example, at least one color information derived from the test field may be transformed by using the color correction. Specifically, a corrected test field color, such as a mean RGB value, may be obtained by using the color correction, specifically the CCM. The intensity-corrected and color-corrected image may then be used for determining the analyte concentration. Thus, as an example, the corrected test field color may be used for determining the concentration of the at least one analyte in the body fluid.

As outlined above, the method according to this disclosure may optionally also comprise deriving at least one color correction in step vi) and applying the color correction to the second intensity-corrected image, thereby obtaining at least one intensity-corrected and color-corrected image, in step vii). Thus, this disclosure also may provide means for a color correction, specifically by using a color correction matrix.

The method may comprise correcting the measured colors of an imaging device using a linear matrix, such as the color correction matrix, and/or optimizing the measured colors. Thus, as outlined above, the color correction specifically may comprise a color correction matrix. An image of at least one color reference, such as the color reference card, may be captured, wherein the color reference may comprise objects with known color values, such as the color reference fields. The color correction matrix may be determined, for example, by a linear optimization approach, such that the measured color values may be transformed into the corresponding known color values.

The color correction matrix may transform measured RGB color values $R_{Measured}$, $G_{Measured}$, $B_{Measured}$ into corresponding known color reference values $R_{Real}$, $G_{Real}$, $B_{Real}$:

$$\begin{pmatrix} R_{Real} \\ G_{Real} \\ B_{Real} \end{pmatrix} = \begin{pmatrix} CCM_{11} & CCM_{12} & CCM_{13} \\ CCM_{21} & CCM_{22} & CCM_{23} \\ CCM_{31} & CCM_{32} & CCM_{33} \end{pmatrix} \begin{pmatrix} R_{Measured} \\ G_{Measured} \\ B_{Measured} \end{pmatrix}.$$

The color correction matrix may be determined such that the transformation of measured color values by the color correction matrix may preserve gray values. In mathematical terms, the vector $\vec{e}=(1,1,1)$ may be an eigenvector of the color correction matrix. Further, the color correction matrix may be determined using at least two color reference fields:

$$\begin{pmatrix} C & 0 & 0 \\ 0 & C & 0 \\ 0 & 0 & C \end{pmatrix} \cdot \begin{pmatrix} \vec{r}_{sRGB1} \\ \vec{r}_{sRGB2} \\ \vec{e} \end{pmatrix} = \begin{pmatrix} \vec{r}_{Ref1} \\ \vec{r}_{Ref2} \\ \vec{e} \end{pmatrix}, \text{wherein } 0 = \begin{pmatrix} 0 & 0 & 0 \\ 0 & 0 & 0 \\ 0 & 0 & 0 \end{pmatrix} \text{ and } \vec{e} = \begin{pmatrix} 1 \\ 1 \\ 1 \end{pmatrix},$$

wherein C denotes the color correction matrix, $\vec{r}_{sRGB1}$ and $\vec{r}_{sRGB2}$ denote measured color values and $\vec{r}_{Ref1}$ and $\vec{r}_{sRef1}$ denote the known color reference values of the color reference fields. The color correction matrix may also be derived using a plurality of color reference fields, specifically more than two color reference fields, for example, three or even more color reference fields. Thus, the color correction matrix may be determined by fitting above-mentioned equation using the plurality of color reference fields. The conservation of gray values by the color correction may further be implemented as an additional constraint to the fitting procedure. As an example, the color reference card comprise the plurality of color reference fields, wherein the number of color reference fields may exceed the number of color reference fields which are necessary for deriving the color correction matrix. Thus, the color correction matrix may be determined by using a regression analysis.

Further, the color correction may be derived by using a selection of color reference fields, as will be outlined in further detail below. By selecting color reference fields for deriving the color correction matrix, specifically by selecting color reference fields in an environment of the color of the test field, the accuracy of the color correction may be enhanced.

Thus, the color correction may provide means for enhancing the accuracy and the method reliability, specifically for determining a color change of the color formation reaction of the test field. The color correction may specifically comprise at least one selection of color reference fields, described in further detail below.

The standard color correction often takes into account the whole color space. Therefore, the color reference may comprise color reference fields having colors distributed over the whole color space.

The selection of color reference fields may comprise selecting color reference fields in a predetermined subspace of the color space. The predetermined subspace may comprise colors which may be present in the color formation reaction of the test field. Thus, the selection of color reference fields may comprise selecting color reference fields having a color similar to the color formation reaction of the test field. The selection of color reference fields may enhance the color correction in the predetermined subspace, specifically without taking into account colors outside the predetermined subspace.

As another example, additionally or alternatively, the selection of the color reference fields may comprise selecting color reference fields such that the colors of the selected color reference fields may have a predetermined distance to each other and which comprise the color of the test field. Thus, this selection of color reference fields may lead to the color correction being valid on a broader color subspace and, thus, may provide more robust results.

Additionally or alternatively, the selection of the color reference fields may further comprise weighting the color reference fields differently. As an example, color reference fields having a color comprised by the predetermined color subspace may be given a higher weight than color reference fields having a color outside the color subspace. Thus, the accuracy of the color correction in this part of the color subspace may be enhanced, while maintaining a suitable level of accuracy of the color correction outside the color subspace.

As an example, the selection of color reference fields may be based on dynamically selecting color reference fields in an environment of the color of the test field in the color space. In general, color reference fields having a color value in the color subspace of the color formation reaction may be present on the color reference card. In this case, the color reference fields may be selected which are necessary to span a color subspace enclosing the respective color of the color of the test field. The respective color subspace may be smaller than the predetermined color subspace, and thus the color correction may be more precise. For example, a plurality of color reference fields, such as four or more color reference fields, may be selected such that the selection of color reference fields may span a tetrahedron in the color space enclosing the color of the test field.

Additionally or alternatively, the selection of color reference fields may comprise a dynamic weighting of the color reference fields. Specifically, color reference fields may be weighted by giving color reference fields having a color close to the color of the test field a higher weight than color reference fields being further away from the color of the test field in the color space. Thus, the color correction may be optimized for a color subspace corresponding to the color of the test field. For example, the weighting of color reference fields may comprise a weighting factor taking into account the distance of the color value of the color reference field to the color value of the test field. Thus, the color reference field may be weighted by an inverse of the Euclidean distance in the color space between the color reference field and the test field.

As another example, the selection of the color reference fields may be based on the accuracy of a color correction of one or more test color fields having known color values. The test color field may be an additional color field and/or one of the color reference fields with known reference color values. The test color field may be selected such that the color of the test color field may be close to the color of the reagent test field. The color correction may be derived using the remaining color reference fields. The accuracy of the color correction matrix may be determined by transforming the selected test color field and further, by comparing the transformed color value to the respective known reference color value. The accuracy of the color correction of the test color field may be used to optimize the selection of color reference fields for determining the color correction matrix. Additionally or alternatively, the selected test color field may be included for deriving the color transformation matrix. The accuracy of the color correction matrix may be determined by the deviation of the transformed color value of the test color field from the respective known reference color value. Further, a deviation of two test color fields having similar colors from the respective known color values may be used as a second order correction for determining the color of the reagent test field.

The selection of color reference fields for the color correction may further comprise a dynamic selection of color reference fields. Thus, the selection may adapt to the color of the color formation reaction of the test field.

Further, the selection of the color reference fields may also be based on selecting color reference fields in accordance with an accuracy of the color correction. Specifically, the accuracy may be determined by cross-validating color reference fields. For example, the cross-validating may comprise excluding at least one color reference fields from the determination of the color correction. Thus, the color correction matrix may be determined with the remaining color reference fields. The cross-validating may further comprise checking the accuracy of the color correction matrix by transforming the excluded color reference field. Additionally or alternatively, the cross-validating may also comprise excluding two or more color reference fields.

Generally, color reference fields may be selected having a color close to the color of the reagent test field. Thus, by cross-validating color reference fields, overfitting effects for the color correction may be avoided. Further, the color reference fields excluded from the color correction may be involved for determining the color correction matrix after having optimized the selection of the color reference fields for the color correction.

Further, step vi) may additionally comprise correcting the gray values of the image. The correction of gray values may specifically comprise at least one correction factor, wherein the at least one correction factor may be determined such that the RGB color values of gray values are equal to each other. Specifically, the correction of gray values may comprise at least one correction factor for each RGB color value. The at least one correction factor may then be applied to the color values of the second intensity-corrected image, specifically before deriving the color correction matrix.

Summarizing and without excluding further possible embodiments, the following embodiments may be envisaged:

Embodiment 1: A method of determining the concentration of at least one analyte in a sample of a bodily fluid by using a mobile device having at least one camera, the method comprising:
  i) capturing, by using the camera, at least one image of at least a part of a color reference card and of at least a part of at least one reagent test field of at least one optical test strip having the sample applied thereto,
    wherein, in the image, the test field is in a defined position with respect to the color reference card,
    wherein the color reference card comprises a plurality of different gray reference fields locally assigned to the test field, wherein the plurality of gray reference fields and the test field specifically may be locally assigned to each other by being placed in neighboring positions or wherein the plurality of gray reference fields locally assigned to the test field specifically may be arranged on the color reference card such that the plurality of gray reference fields surrounds the test field, and
    wherein the color reference card comprises a plurality of different color reference fields having known reference color values and a plurality of different gray reference fields locally assigned to the color reference fields, wherein the plurality of gray reference fields and the color reference fields specifically may be locally assigned to each other by being placed in neighboring positions or wherein the plurality of gray reference fields locally assigned to the color reference fields specifically may be arranged on the color reference card such that the plurality of gray reference fields surrounds the color reference fields,
  ii) applying at least one predetermined pixel-based mean tone map correction to the image obtained in step i), thereby obtaining at least one first intensity-corrected image, wherein the predetermined pixel-based mean tone map correction specifically may comprise an assignment of a second brightness value to a first brightness value, wherein the first brightness value may be recorded by an imaging device, specifically by the camera, wherein each pixel of the recorded image may be corrected individually by the predetermined pixel-based mean tone map correction, wherein the mean tone map correction may be derived by combining a plurality of tone map corrections for different types of mobile devices;
  iii) deriving, from the first intensity-corrected image, local brightness information for at least some of the color reference fields and for the test field, by using the gray reference fields locally assigned to the color reference fields and the test field, respectively, wherein the local brightness information specifically may comprise a numerical indication describing the local intensity of at least one RGB color of the color reference fields and the test field, respectively;
  iv) applying at least one local tone map correction, specifically at least one mobile device-specific tone map correction, to the first intensity-corrected image, the local tone map correction, specifically at least one mobile device-specific tone map correction, taking into account the local brightness information, thereby obtaining at least one second intensity-corrected image; and
  v) determining the analyte concentration based on a color formation reaction of the test field by using the second intensity-corrected image.

Embodiment 2: The method according to the preceding embodiment, further comprising specifically after performing step iv) and before performing step v):
  vi) deriving, by using at least some of the color reference fields in the second intensity-corrected image, at least one color correction; and
  vii) applying the color correction to the second intensity-corrected image, thereby obtaining at least one intensity-corrected and color-corrected image.

Embodiment 3: The method according to the preceding embodiment, wherein the method further comprises, prior to step vi), a local white balancing of at least some of the color reference fields and of the test field, specifically of all of the color reference fields.

Embodiment 4: The method according to the preceding embodiment, wherein the local white balancing comprises, for the color reference fields or the test field, respectively, subject to the white balancing, using the gray reference fields locally assigned to the respective color reference fields or the test field, respectively, and deriving local corrections, specifically local correction factors, for the respective color reference fields or the test field, respectively, by comparing measured color coordinates of the gray reference fields with known color coordinates of the gray reference fields.

Embodiment 5: The method according to the preceding embodiment, wherein the local white balancing further comprises applying the respective local corrections to measured color coordinates of the respective color reference fields or the test field, respectively.

Embodiment 6: The method according to any one of the four preceding embodiments, wherein, for performing step vi), the second intensity-corrected image is replaced by a locally white-balanced second intensity-corrected image or is a locally white-balanced second intensity-corrected image.

Embodiment 7: The method according to any one of the five preceding embodiments, wherein the color correction comprises at least one color correction matrix, wherein step vii) comprises applying the color correction matrix to color coordinate vectors of the image.

Embodiment 8: The method according to any one of the six preceding embodiments, wherein the determining of the analyte concentration in step v) takes into account the intensity-corrected and color-corrected image.

Embodiment 9: The method according to any one of the seven preceding embodiments, wherein, in step vi), the color correction is derived by using a selection of the color reference fields.

Embodiment 10: The method according to the preceding embodiment, wherein the selection of the color reference fields is based on at least one of:
selecting color reference fields in a predetermined subspace of the color space;
dynamically selecting color reference fields in an environment of the color of the test field in the color space;
weighting color reference fields differently, specifically by giving color reference fields having a color close to the color of the test field a higher weight than color reference fields being further away from the color of the test field in the color space;
selecting color reference fields in accordance with an accuracy of the color correction, specifically an accuracy determined by cross-validating color reference fields.

Embodiment 11: The method according to any one of the preceding embodiments, wherein the pixel-based mean tone map correction comprises at least one of: a mean tone map correction derived by combining a plurality of tone map corrections for different types of mobile devices; an inverse of a standard Gamma correction.

Embodiment 12: The method according to any one of the preceding embodiments, further comprising selecting at least one area of interest from the at least one image captured in step i), wherein step ii) is performed on the basis of the area of interest.

Embodiment 13: The method according to the preceding embodiment, wherein the area of interest is determined by at least one of: at least one position marker visible in the image, specifically at least one ArUco code marker; image recognition for detecting at least one feature in the image, specifically image recognition for detecting an area of the color reference card comprising the gray reference fields and the color reference fields.

Embodiment 14: The method according to any one of the preceding embodiments, further comprising, specifically before performing step iv), performing at least one statistical modification of the first intensity-corrected image, wherein step iv) is performed on the basis of the statistically modified first intensity-corrected image.

Embodiment 15: The method according to the preceding embodiment, wherein the statistical modification comprises creating histograms for the gray reference fields, the color reference fields and the test field visible in the first intensity-corrected image.

Embodiment 16: The method according to any one of the preceding embodiments, wherein, for the gray reference fields, the color reference fields and the test field visible in the first intensity-corrected image, pixel-based image information is replaced by representative information, specifically by average information, for the gray reference fields, the color reference fields and the test field, respectively.

Embodiment 17: The method according to any one of the preceding embodiments, wherein the local tone map correction is a mobile device-specific individual tone map correction.

Embodiment 18: The method according to any one of the preceding embodiments, wherein the gray reference fields locally assigned to the test field surround the test field, wherein the gray reference fields locally assigned to the test field and the test field form a test field group.

Embodiment 19: The method according to the preceding embodiment, wherein the test field group comprises a plurality of redundant gray reference fields having at least three different gray levels, wherein at least two redundant gray reference fields are provided for each gray level.

Embodiment 20: The method according to the preceding embodiment, wherein the redundant gray reference fields are arranged around the test field in a symmetric fashion, specifically in a rotationally symmetric and/or a mirror symmetric fashion.

Embodiment 21: The method according to any one of the two preceding embodiments, wherein, in step iii), the local brightness information for the test field is determined by averaging over redundant gray reference fields having the same gray level.

Embodiment 22: The method according to any one of the four preceding embodiments, wherein the test field group shares at least some of the gray reference fields with at least one neighboring local color reference field group.

Embodiment 23: The method according to any one of the preceding embodiments, wherein the gray reference fields locally assigned to the color reference fields surround the respective color reference fields, wherein the gray reference fields locally assigned to one of the color reference fields and the respective color reference field form a local color reference field group.

Embodiment 24: The method according to the preceding embodiment, wherein each local color reference field group comprises a plurality of redundant gray reference fields having at least three different gray levels, wherein at least two redundant gray reference fields are provided for each gray level.

Embodiment 25: The method according to the preceding embodiment, wherein the redundant gray reference fields are arranged around the color reference field of the respective local color reference field group in a symmetric fashion, specifically in a rotationally symmetric and/or a mirror symmetric fashion.

Embodiment 26: The method according to any one of the two preceding embodiments, wherein, in step iii), the local brightness information for the respective local color reference field group is determined by averaging over redundant gray reference fields having the same gray level.

Embodiment 27: The method according to any one of the four preceding embodiments, wherein at least some of the gray reference fields are shared by neighboring local color reference field groups and/or by the test field group and at least one local color reference field group.

Embodiment 28: The method according to any one of the preceding embodiments, wherein the color reference card contains at least one positioning element for positioning the optical test strip and/or the test field, specifically at least one window element through which the test field is visible when the test strip is placed behind the color reference card.

Embodiment 29: The method according to any one of the preceding embodiments, wherein the capturing of the at least one image in step i) is initiated automatically by the mobile device, specifically when at least one of the color reference card, the test field and the optical test strip are recognized by the mobile device.

Embodiment 30: The method according to any one of the preceding embodiments, further comprising prompting the user to place the color reference card and at least one of the optical test strip and the test field in a field of view of the camera, specifically by displaying a message on a display of the mobile device.

Embodiment 31: The method according to any one of the preceding embodiments, further comprising, specifically after step i), performing a validity check with at least one of a color reference field, a gray reference field and the reagent test field.

Embodiment 32: The method according to the preceding embodiment, wherein the validity check comprises determining at least one color value for the color reference field, the gray reference field and/or the test field from the at least one image captured in step i).

Embodiment 33: The method according to the preceding embodiment, wherein the validity check comprises determining, based on the at least one color value, if at least one validity criterion on the color reference field, the gray reference field and/or the test field is fulfilled.

Embodiment 34: The method according to the preceding embodiment, wherein the validity criterion is at least one of a direct validity criterion and an indirect validity criterion.

Embodiment 35: The method according to any one of the two preceding embodiments, wherein, if the validity criterion is fulfilled, the color reference field, the gray reference field and/or the test field are flagged as valid, wherein, if the validity criterion is not fulfilled, the color reference field, the gray reference field and/or the test field are flagged as invalid.

Embodiment 36: The method according to the preceding embodiment, wherein color reference fields, gray reference fields and/or test fields being flagged as valid are subjected to step ii); and optionally wherein, in case a certain number of color reference fields, gray reference fields and/or test fields, and/or a relative number of at least 10%, 15%, 20%, 25% or 30% of color reference fields, gray reference fields and/or test fields are flagged as invalid, the method may comprise repeating step i).

Embodiment 37: A mobile device having at least one camera, the mobile device being configured for performing the method according to any one of the preceding embodiments.

Embodiment 38: The mobile device according to the preceding embodiment, wherein the mobile device comprises at least one processor.

Embodiment 39: The mobile device according to the preceding embodiment, wherein the mobile device further comprises at least one light source, wherein the mobile device is configured for illuminating the color reference card and the test field during capturing the image in step i).

Embodiment 40: The mobile device according to the preceding embodiment, wherein the second intensity-corrected image is an image corrected for inhomogeneities of the illumination by the light source.

Embodiment 41: A kit for determining the concentration of at least one analyte in a sample of a bodily fluid, the kit comprising the mobile device according to the preceding embodiment, the kit further comprising at least one optical test strip having at least one reagent test field, the kit further comprising at least one color reference card, wherein the color reference card comprises a plurality of different gray reference fields locally assigned to the test field, and wherein the color reference card comprises a plurality of different color reference fields having known reference color values and a plurality of different gray reference fields locally assigned to the color reference fields.

Embodiment 42: A computer program comprising instructions which, when executed by a mobile device having a camera, specifically by the mobile device according to any one of the embodiments referring to a mobile device and/or by the mobile device of the kit according to any one of the preceding embodiments referring to a kit, cause the mobile device to carry out the method according to any one of the preceding embodiments referring to a method.

Embodiment 43: A computer-readable storage medium comprising instructions which, when executed by a mobile device having a camera, specifically by the mobile device according to any one of the preceding embodiments referring to a mobile device and/or by the mobile device of the kit according to any one of the preceding embodiments referring to a kit, cause the mobile device to carry out the method according to any one of the preceding embodiments referring to a method.

BRIEF DESCRIPTION OF THE DRAWINGS

The above-mentioned aspects of exemplary embodiments will become more apparent and will be better understood by reference to the following description of the embodiments taken in conjunction with the accompanying drawings, wherein.

DESCRIPTION

The embodiments described below are not intended to be exhaustive or to limit the invention to the precise forms disclosed in the following detailed description. Rather, the embodiments are chosen and described so that others skilled in the art may appreciate and understand the principles and practices of this disclosure.

Figure 1:
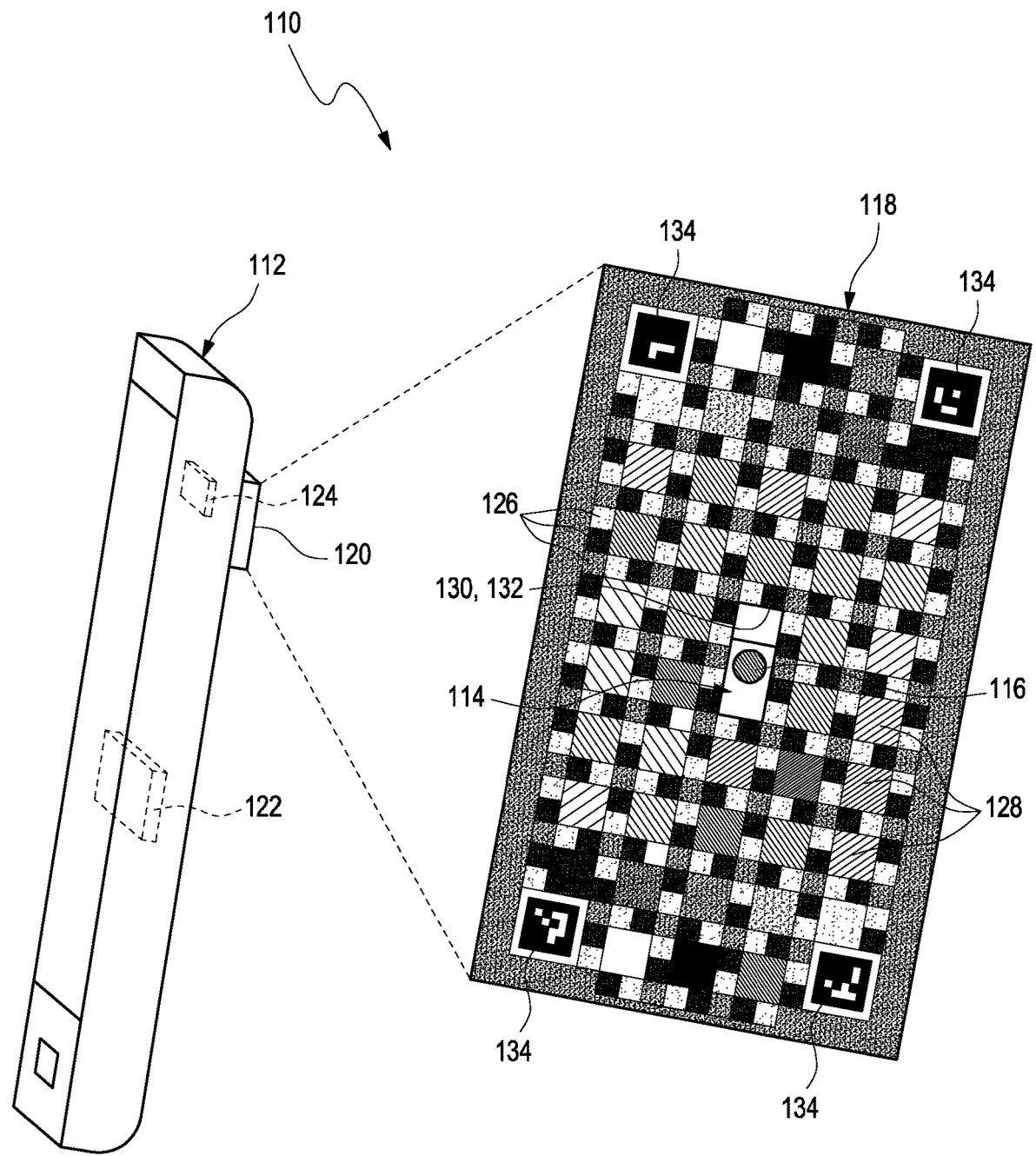
FIG. 1 shows an embodiment of a kit for determining the concentration of at least one analyte in a sample of a bodily fluid.

In FIG. 1, an exemplary embodiment of a kit 110 for determining the concentration of at least one analyte in a sample of a bodily fluid is shown in a perspective view. The kit 110 comprises a mobile device 112 and at least one optical test strip 114 having at least one reagent test field 116. The kit further comprises at least one color reference card 118.

Figure 2:
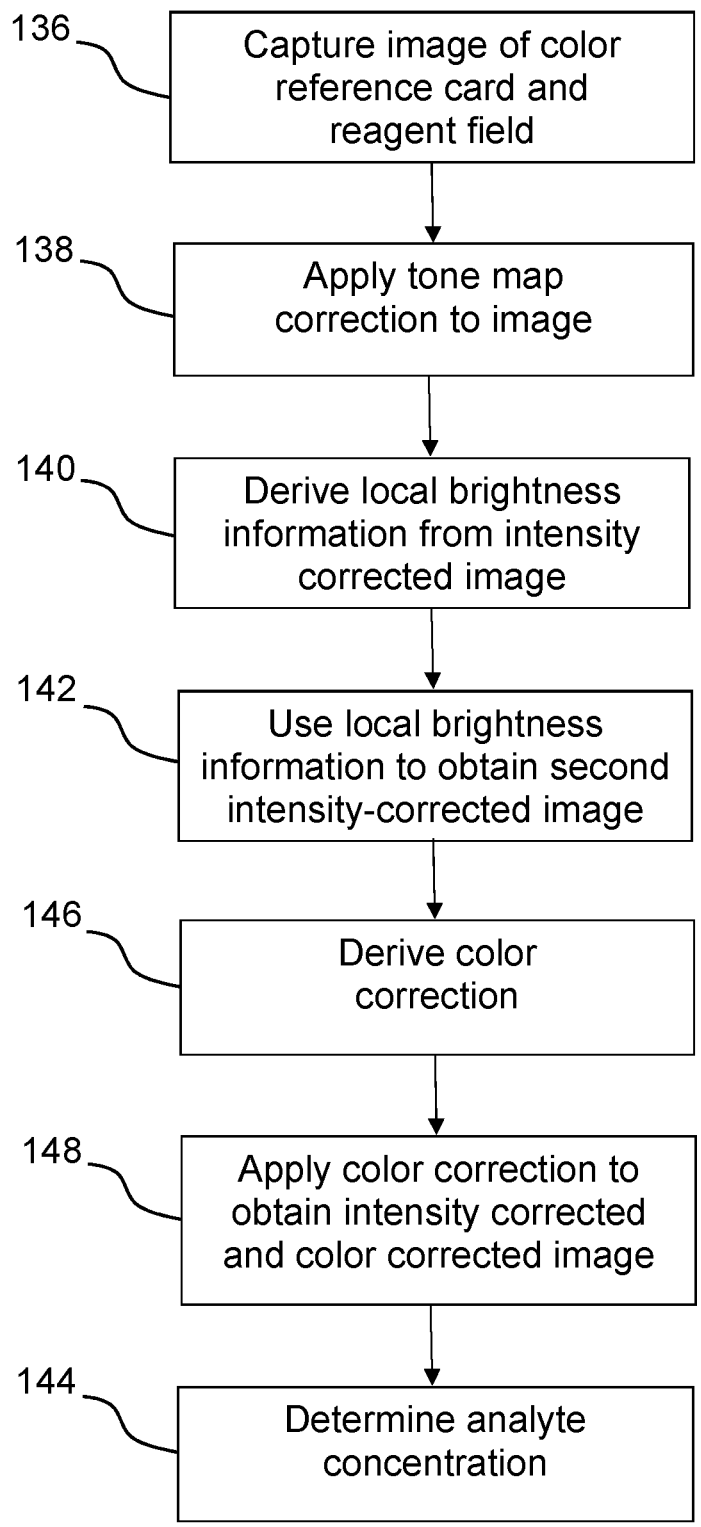
FIG. 2 shows a flow chart of an embodiment of a method of determining the concentration of at least one analyte in a sample of a bodily fluid.

The mobile device 112 has at least one camera 120 and is configured for performing the method of determining the concentration of at least one analyte in a sample of a bodily fluid. An exemplary embodiment of the method is shown in FIG. 2 and will be described in further detail below. Further, the mobile device 112 may comprise at least one processor 122. Specifically, the processor 122 may be configured for performing and/or supporting one or more or even all of the method step i), ii), iii), iv), v) and optionally vi) and vii). The mobile device 112 may further comprise at least one light source 124. Thus, the mobile device 112 may be configured for illuminating the color reference card 118 and the test field 116 during capturing an image in step i) of the method.

Figure 3:
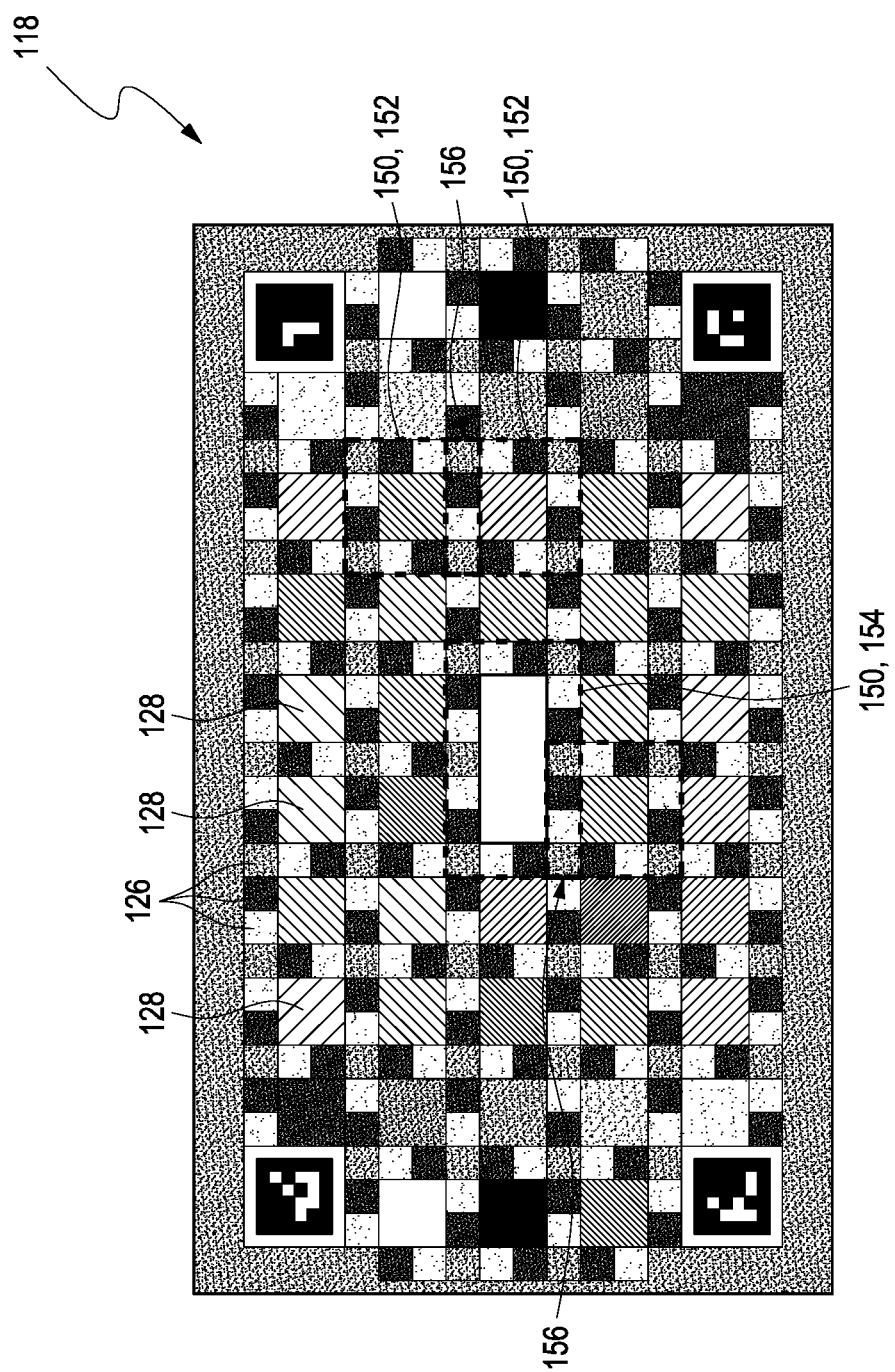
FIG. 3 shows an embodiment of a color reference card.

The color reference card 118 comprises a plurality of different gray reference fields 126 locally assigned to the test field 116. The color reference card 118 further comprises a plurality of different color reference fields 128 having known color reference values and a plurality of different gray reference fields 126 locally assigned to the color reference fields 128. A more detailed view on the color reference card 118 is shown in FIG. 3 and will be described in further detail below. Thus, reference may be made to the description of FIG. 3.

Further, the color reference card 118 may contain at least one positioning element 130 for positioning the optical test strip 114 and/or the test field 116. As an example, the positioning element 130 may be or may comprise at least one window element 132 through which the test field 116 may be visible when the optical test strip 114 is placed behind the color reference card 118. Specifically, the window element may be a cut-out portion of the color reference card 118. Further, the positioning element 130 may be configured for keeping the optical test strip 114 and/or the reagent test field 116 in a defined position with respect to the color reference card 118. The color reference card 118 may further comprise at least one position marker 134. The position marker 134 may be or may comprise at least one ArUco code marker and may, for example, be arranged in at least one corner of the reference card 118.

In FIG. 2, a flow chart of an exemplary embodiment of a method of determining the concentration of at least one analyte in a sample of a bodily fluid is shown. The method comprises using a mobile device 112 having at least one camera 120. Further, the method comprises the following steps, which may specifically be performed in the given order. Still, a different order may also be possible. It may be possible to perform two or more of the method steps fully or partially simultaneously. It may further be possible to perform one, more than one or even all of the method steps once or repeatedly. The method may comprise additional method steps that are not listed.

The method comprises:
i) (denoted with reference number 136) capturing, by using the camera 120, at least one image of at least a part of the color reference card 118 and of at least a part of the at least one reagent test field 116 of the at least one optical test strip 114 having the sample applied thereto,
    wherein, in the image, the test field 116 is in a defined position with respect to the color reference card 118,
    wherein the color reference card 118 comprises a plurality of different gray reference fields 126 locally assigned to the test field 116, and
    wherein the color reference card 118 comprises a plurality of different color reference fields 128 having known reference color values and a plurality of different gray reference fields 126 locally assigned to the color reference fields 128,
ii) (denoted with reference number 138) applying at least one predetermined pixel-based mean tone map correction to the image obtained in step i), thereby obtaining at least one first intensity-corrected image;
iii) (denoted with reference number 140) deriving, from the first intensity-corrected image, local brightness information for at least some of the color reference fields 128 and for the test field 116, by using the gray reference fields 126 locally assigned to the color reference fields 128 and the test field 116, respectively;
iv) (denoted with reference number 142) applying at least one local tone map correction to the first intensity-corrected image, the local tone map correction taking into account the local brightness information, thereby obtaining at least one second intensity-corrected image; and
v) (denoted with reference number 144) determining the analyte concentration based on a color formation reaction of the test field 116 by using the second intensity-corrected image.

In particular, the capturing of the image in step i) may be initiated by the processor 122 of the mobile device 112. For example, the processor 122 may be configured for prompting a user of the mobile device 112 to capture the image of the color reference card 118 and of the test field 116. Additionally or alternatively, the processor 122 may be configured for automatically capturing the image of the color reference card 118 and of the test field 116. For this purpose, the processor 122 may be configured for detecting the color reference card 118 and the test field 116 in a field of view and further for controlling the camera 120 of the mobile device 112 to capture the image. Further, the processor 122 may be configured for prompting the user to apply the sample of the bodily fluid to the test field 116 of the optical test strip 114. Specifically, the user may be prompted to apply the sample before capturing the image of the color reference card 118 and the test field 116.

The positioning element 130 comprised by the color reference card 118 may be visible in the image captured in step i). The processor 122 may be configured for cropping the image captured in step i) to the size of the color reference card 118 for further processing. Thus, step i) may also comprise cropping the captured image to a selected area, specifically to an area of interest. For example, the area of interest may be indicated by the positioning element 130 comprised by the color reference card 118.

In step ii), the predetermined pixel-based mean tone map correction may be applied to the image captured in step i), specifically to the area of interest of the image. The pixel-based mean tone map correction may comprise at least one of: a mean tone map correction derived by combining a plurality of tone map corrections for different types of mobile devices 112; an inverse of a standard Gamma correction. An exemplary function of the mean tone map correction derived by combining a plurality of tone map corrections for different types of mobile devices 112 is shown in FIG. 5a and will be described in further detail below.

Further, the processor 122 of the mobile device 112 may be configured for retrieving information about the orientation of the color reference card 118 from the at least one positioning element 130. The processor 122 may further be configured for identifying the color reference fields 128 comprised by the color reference card 118 and for determining color values of the identified color reference fields 128. Specifically, the color values of the color reference fields 128 may be determined after performing step ii), e.g., after the pixel-based mean tone map correction of the image captured in step i).

The method may further comprise performing at least one statistical modification of the first intensity corrected image. The statistical modification may specifically be performed before performing step iv). As an example, the statistical modification may comprise creating histograms for the gray reference field 126, the color reference fields 128 and the test field 116 visible in the first intensity-corrected image. Further, for the gray reference fields 126, the color reference fields 128 and the test field 116, pixel-based information may be replaced by representative information, specifically by average information, for the gray reference fields 126, the color reference fields 128 and the test field 116, respectively. Thus, average information for the gray reference fields 126, the color reference fields 128 and the test field 116 may be obtained by performing the at least one statistical modification of the first-intensity corrected image.

In step iii), local brightness information from the first intensity-corrected image for at least some of the color reference fields 128 and for the test field 116 are derived by using the gray reference fields 126 locally assigned to the color reference fields 128 and the test field 116, respectively. The color reference card 118 comprising the gray reference fields 126 locally assigned to the color reference fields 128 and the test field 116 is shown in FIG. 3 in a detailed view, and, thus, reference may be made to the description of FIG. 3.

Figure 6:
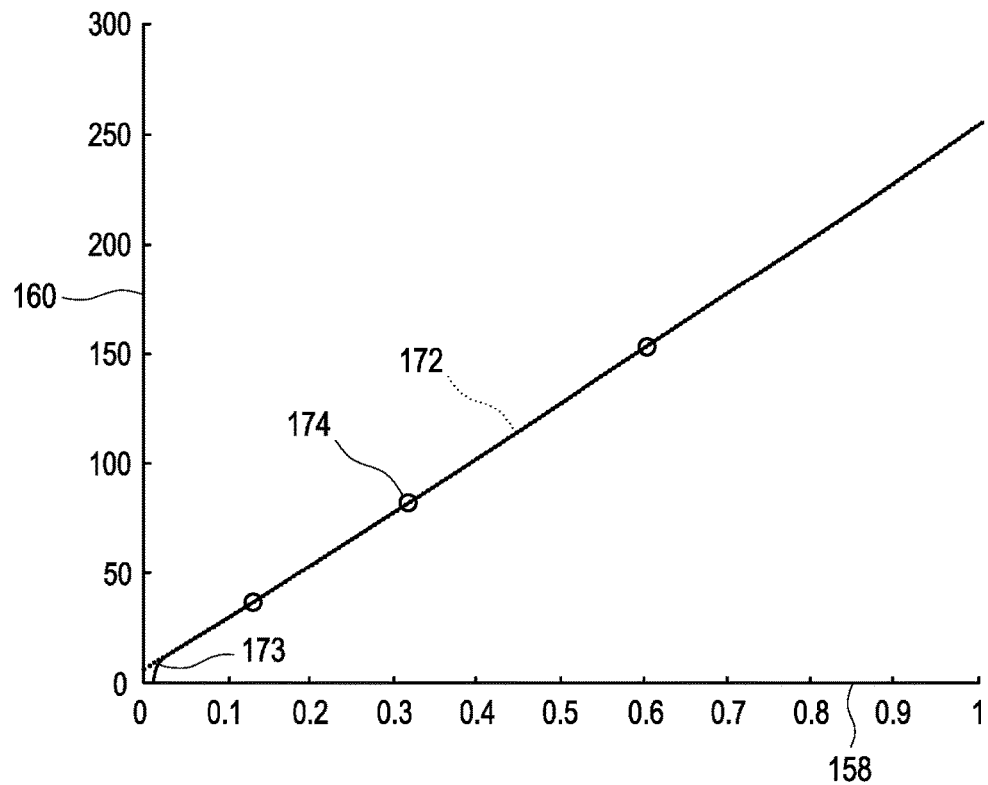
FIGS. 6a and 6b show a parabolic approximation of a local mean tone map correction for different types of mobile devices.
Figure 6:
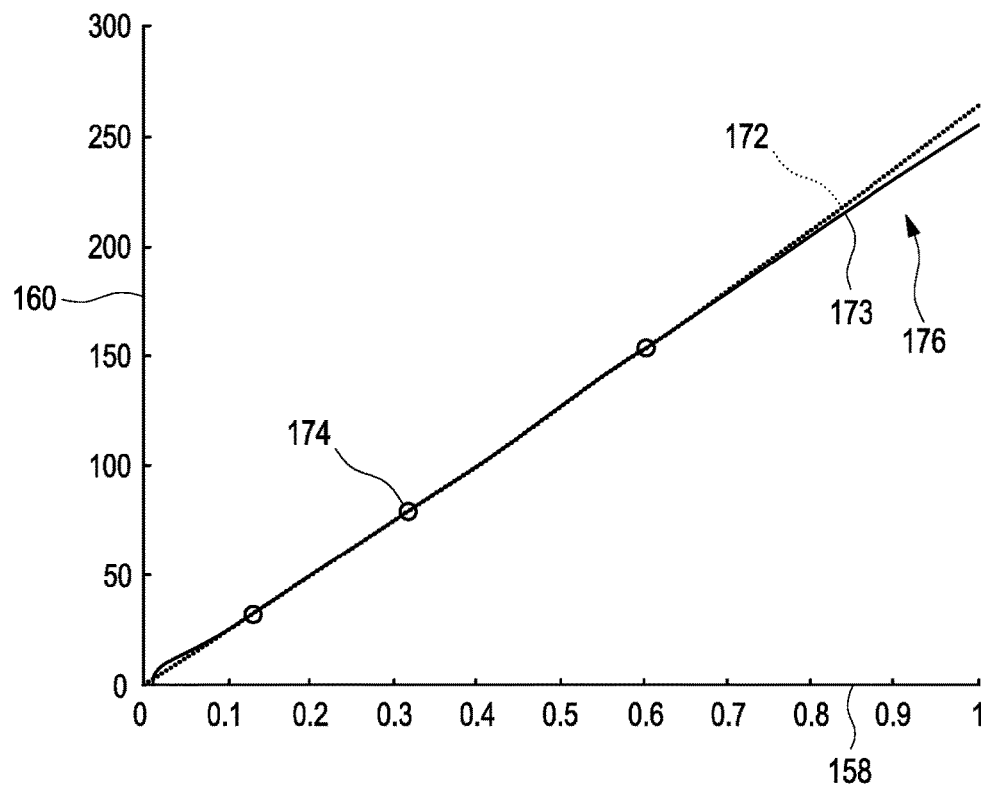

Step iv) comprises applying a local tone map correction to the first-intensity corrected image, wherein the local tone map correction specifically may be a mobile device-specific individual tone map correction. As an example, the local tone map correction may comprise a mathematical relation represented by a parabolic approximation. Exemplary parabolic approximations are shown in FIGS. 6a and 6b. Reference may therefore be made to the description of FIGS. 6a and 6b. By applying the local tone map correction to the first-intensity corrected image, the second intensity-corrected image may be obtained.

Further, by using the second-intensity corrected image, step v) comprises determining the analyte concentration based on the color formation reaction of the test field 116. The determination of the analyte concentration may specifically comprise relating a color value of the test field 116 to the analyte concentration. Specifically, the color value of the test field 116 may be dependent on the analyte concentration of the sample of bodily fluid and, thus, on the color formation reaction of the test field 116 having the sample of the bodily fluid applied thereto.

The method may further comprise:
vi) (denoted with reference number 146) deriving, by using at least some of the color reference fields 128 in the second intensity-corrected image, at least one color correction; and
vii) (denoted with reference number 148) applying the color correction to the second intensity-corrected image, thereby obtaining at least one intensity-corrected and color-corrected image.

Specifically, the method steps vi) and vii) may be performed optionally after method step iv) and before method step v). In particular, the color correction may be or may comprise at least one color correction matrix. Thus, in step vii), the color correction may be applied by applying the color correction matrix to color coordinate vectors of the image. The color correction may further be derived by using a selection of the color reference fields 128. The selection of the color reference fields 128 will be described in further detail in FIGS. 7a to 7c. Reference may therefore be made to the description of FIGS. 7a to 7c. As an example, step v) may comprise determining the analyte concentration based on the color formation reaction of the test field 116 by using the second intensity-corrected and color-corrected image obtained in step vii).

The method may further comprise, prior to step vi), a local white balancing of at least some of the color reference fields 128 and of the at least one test field 116. In the following, for the sake of simplicity, the procedure of the local white balancing will be described for the color reference fields 128. It shall be noted, however, that the local white balancing may similarly be performed for the at least one test field 116.

Specifically, the local white balancing may be applied at least to the selection of color reference fields 128 used for the color correction in step vi). The local white balancing may comprise, for the color reference fields 128 subject to the white balancing, using the gray reference fields 126 locally assigned to the respective color reference fields 128. The measured color coordinates of the gray reference fields 126 and/or an average of measured color coordinates of redundant gray reference fields 126 locally assigned to the respective color reference fields 128 may be used for the local white balancing. A local correction may be derived by comparing the measured color coordinates of the gray reference fields 126 and/or the average of measured color coordinates of redundant gray reference fields 126 with known color coordinates of the gray reference fields 128. The respective local correction may be applied to measured color coordinates of the respective color reference field 128. As outlined above, the white balancing may also be applied to the test field 116 by using the gray reference fields locally assigned to the test field 116.

The second intensity-corrected image may be replaced by a locally white-balanced second intensity-corrected image. The color correction in step vi) may be performed using the locally white-balanced second intensity-corrected image. For determining the analyte concentration based on the color formation reaction of the test field 116, the locally white-balanced second intensity-corrected and color-corrected image may be used. The local white balancing may specifically take into account and may correct inhomogeneous lighting conditions, for example, caused by different light sources having different light colors, such as ambient light interfering with a light source of the mobile device 112.

In FIG. 3, an exemplary embodiment of the color reference card 118 is shown. The color reference card comprises a plurality of gray reference fields 126 locally assigned to the test field 116. The color reference card 118 further comprises a plurality of color reference fields 128 having known color reference values and a plurality of gray reference fields 126 locally assigned to the color reference fields 128. The color reference fields 128 may specifically be locally distributed over the color reference card 118. Further, at least two of the color reference fields 128 may have different reference color values.

As outlined above, the color reference card 118 comprises a plurality of color reference fields 128 having known color reference values. The known color reference values of the color reference fields 128 may be selected such that the color values may be linearly independent from each other and such that the color values may not be comprised by a common line and/or plane in the color space. The color values may typically be generated by measuring the color values of the color formation reaction of the test field 116 having a defined glucose concentration applied thereto. Thus, the respective color values may lie on a reaction curve in the color space. In the xyz-color space, the reaction curve may be described approximately by two straight-line sections. Thus, the color values of the color formation reaction may not span a three-dimensional volume in the color space, but rather lie on a common line and/or plane. Therefore, in addition to the color values of the color formation reaction, the known color reference values may comprise further color values such that the known color reference values include the relevant volume in the color space.

For example, the color reference card 118 may comprise the plurality of color reference fields 128 having at least fifteen different known color reference values. The known color reference values may be determined by measuring color values of the color formation reaction of the reagent test field 116 having a sample of a bodily fluid with a known concentration of glucose applied thereto. Additionally, the known reference color values may comprise generated color values corresponding to a corner-point of the color subspace of the color formation reaction. Thus, the plurality of color reference fields 128 may span the respective volume of the color space. The color values of the color reference fields 128 may be selected in accordance with the color values of the color formation reaction and, thus, may specifically not be distributed over the entire color space.

Further, to each color reference field 128, a plurality of gray reference fields may be locally assigned, such that the color reference field 128 and the assigned plurality of gray reference fields may form a local group 150, specifically a local color reference group 152. As another example, a plurality of gray reference fields 126 may be locally assigned to the test field 116 such that the test field 116 and the plurality of gray reference fields 126 may form the local group 150, specifically a test field group 154. The local groups 150 may be localized in different locations of the color reference card 118.

Specifically, the local group 150 may comprise a plurality of redundant gray reference fields 126 having at least three different gray levels. Further, at least two redundant gray reference fields 126 having the same gray level may be provided for each local group 150. The redundant gray reference fields 126 may be arranged around the test field 116 and/or the color reference field 128 in a symmetric fashion, specifically in a rotational symmetric and/or a mirror symmetric fashion. Thus, the local brightness information for the test field and/or the color reference fields 128 obtained in step iii), may be determined by averaging over redundant gray reference fields 126 having the same gray level. Specifically, the averaging of redundant gray reference fields 126 may take into account the distance of the gray reference field 126 to the test field 116 and/or the color reference field 128, more specifically by weighting color values of redundant gray reference fields 126 with their reciprocal quadratic distance to the test field 116 and/or the color reference field 128, respectively.

Further, the test field group 154 may share at least some of the gray reference fields 126 with at least one neighboring local color reference group 156. At least some of the gray reference fields 126 may also be shared by neighboring local color reference field groups 152.

Figure 4:
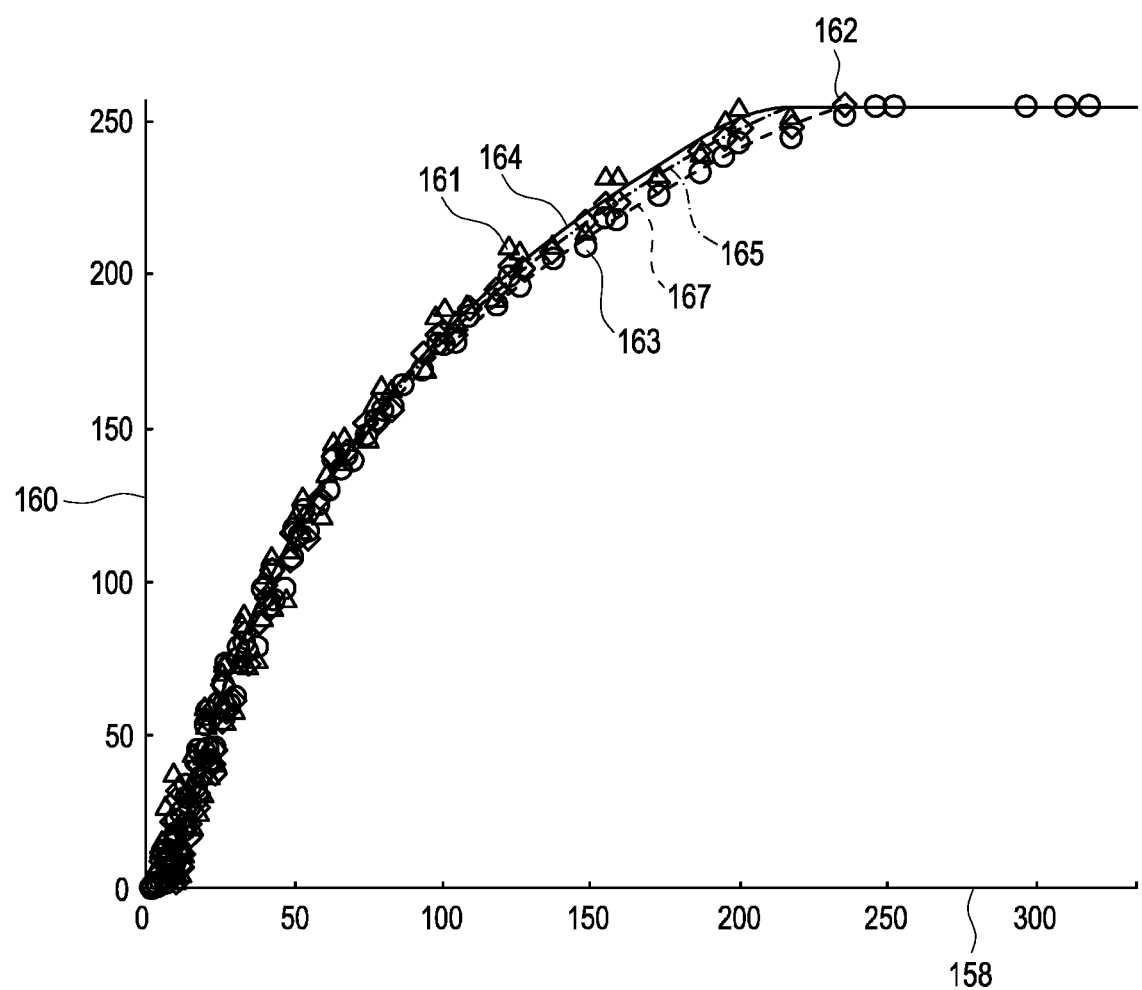
FIG. 4 shows an example of a typical tone map correction of a mobile device.

FIG. 4 shows an example of a typical tone map correction of one mobile device 112. The graph of the tone map correction is shown in the diagram, wherein on the x-axis the incoming light intensity 158 and on the y-axis the measured color value 160 for each of the RGB colors is shown. The tone map correction of the mobile device 112 has been measured (denoted by reference number 161 for the red color channel, by reference number 162 for the green color channel and by reference number 163 for the blue color channel), represented in FIG. 4 by circles, and an empirical function has been fitted (denoted by reference number 164 for the red color channel, by reference number 165 for the green color channel and by reference number 167 for the blue color channel) to the measured color values, represented by solid lines in FIG. 4. As can be seen in FIG. 4, the tone map correction may be similar for each of the RGB color values.

Figure 5:
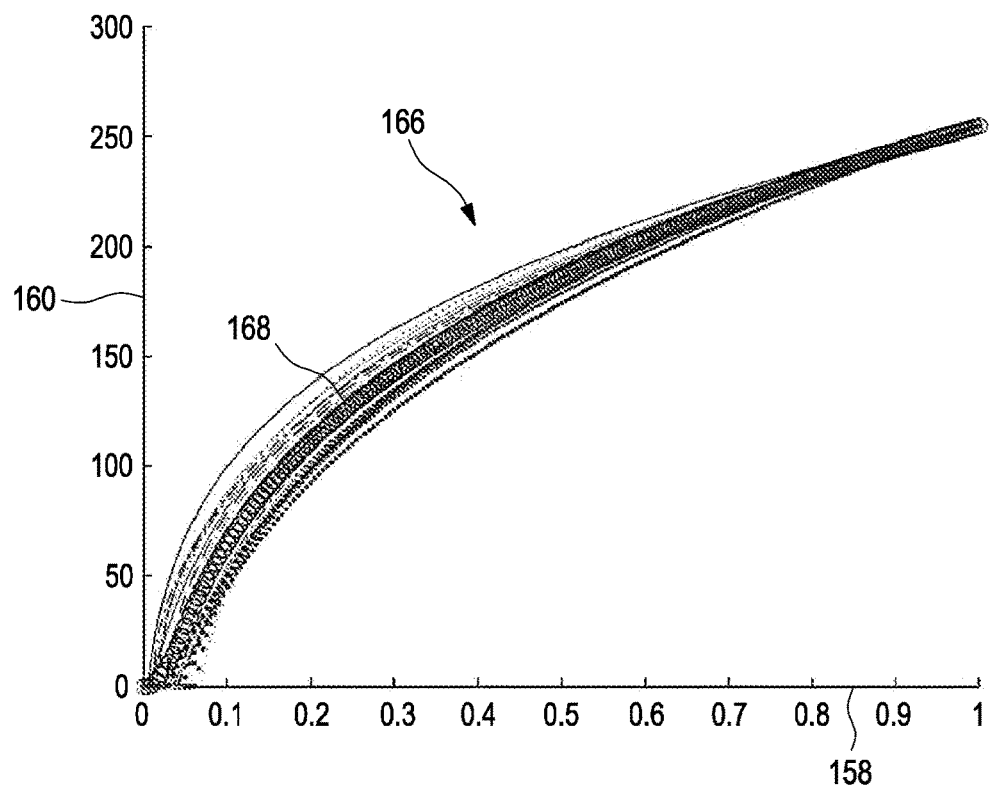
FIGS. 5a and 5b show a plurality of tone map corrections for different types of mobile devices before (5a) and after (5b) applying a mean tone map correction.
Figure 5:
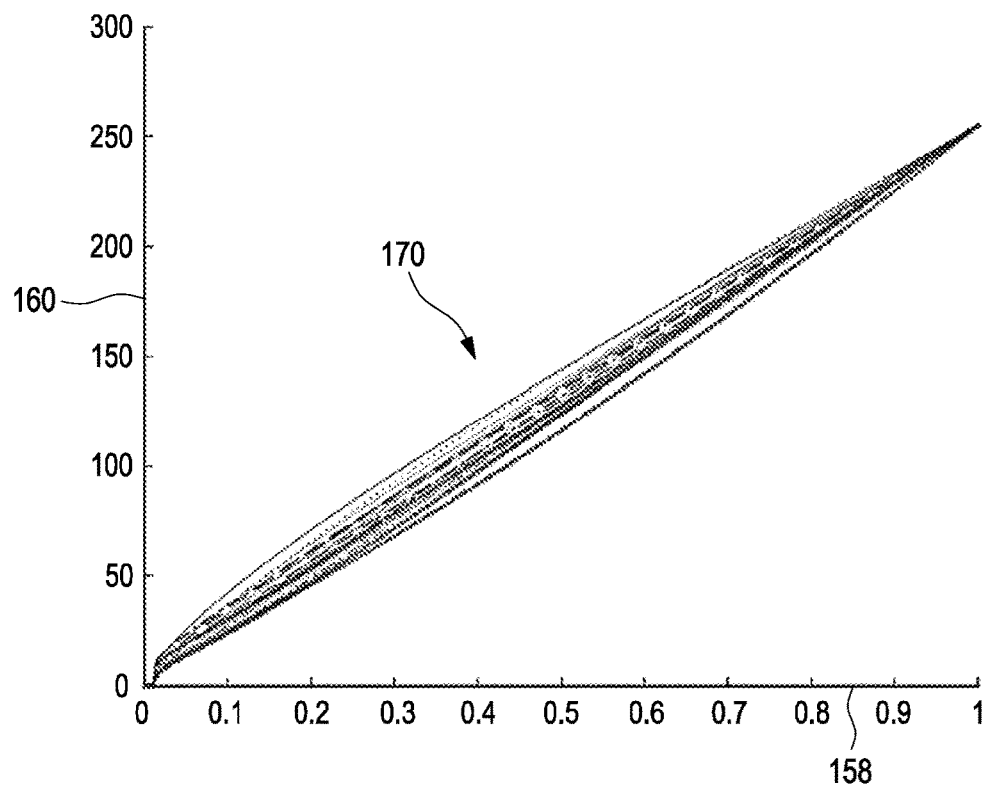

In FIGS. 5a, a plurality of tone map corrections 166 for different types of mobile devices 112 is shown. The plurality of tone map corrections 166 is shown in a diagram with the incoming light intensity plotted on the x-Axis 158 and the measured color value 160 on the y-axis. Further, the plurality of tone map corrections 166 for the different types of mobile devices 112 may be used to derive the mean tone map correction applied to the image captured in step i) of the method. Specifically, the mean tone map correction may be derived by averaging the plurality of tone map corrections 166 for the different types of mobile devices 112. The graph of the mean tone map correction 168 is shown in the diagram of FIG. 5 in the form of circles.

The plurality of resulting tone map corrections 170 of the different mobile devices 112 after performing step ii), e.g., after applying the mean tone map correction to the captured image, is shown in FIG. 5b. As can be seen in FIG. 5, a non-linearity may remain for most of the tone map corrections. The remaining non-linearity may be approximated by a fitted parabolic function and, thus, may be used in step iv) of the method, as will be outlined in further detail below.

In FIGS. 6a and 6b, a graph of a parabolic approximation 172 of a local mean tone map correction for different types of mobile devices 112 is shown. Specifically, FIG. 6a shows the best achieved parabolic approximation 172, while FIG. 6b shows the worst achieved parabolic approximation 172 of the local tone map correction. As shown in FIGS. 6a and 6b by open circles, the local tone map corrections may take into account the local brightness information 174 derived in step iii) of the method. The local brightness information 174 may be used for determining the parabolic approximation 172, specifically by fitting a parabolic function to the local brightness information 174. As can be seen in FIG. 6b, the parabolic approximation may show a deviation 176 from the resulting tone map correction 173, specifically at high and/or low intensity values.

Figure 7:
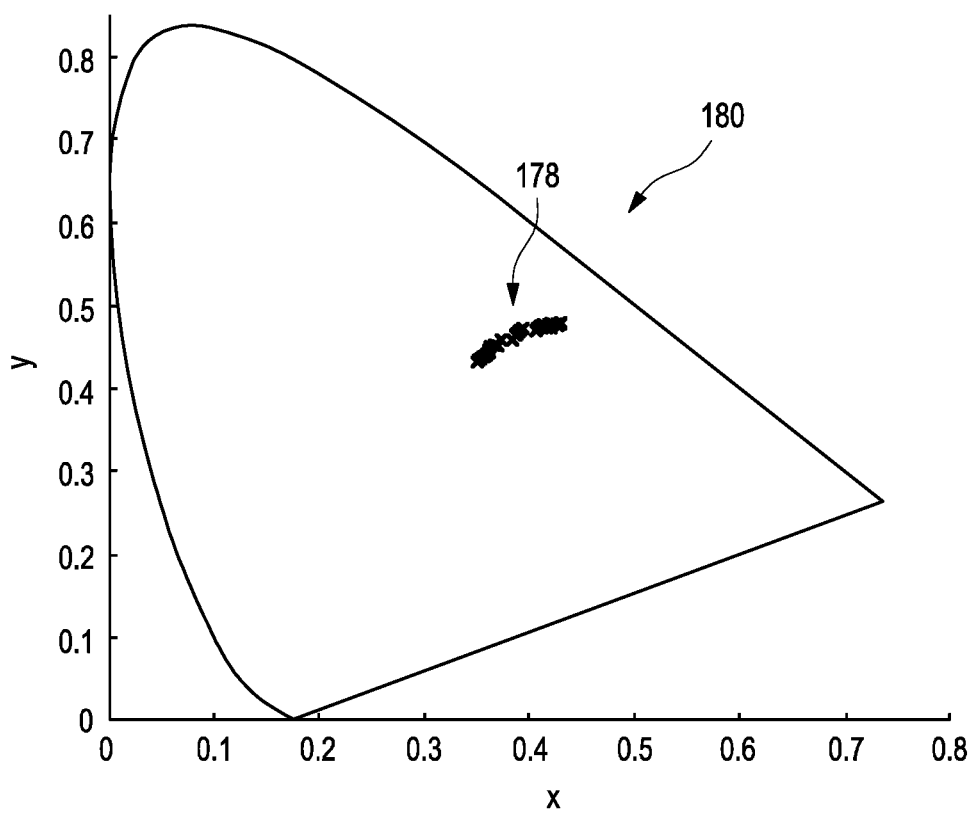
FIGS. 7a to 7c show a subspace of a color formation reaction in a color diagram.
Figure 7:
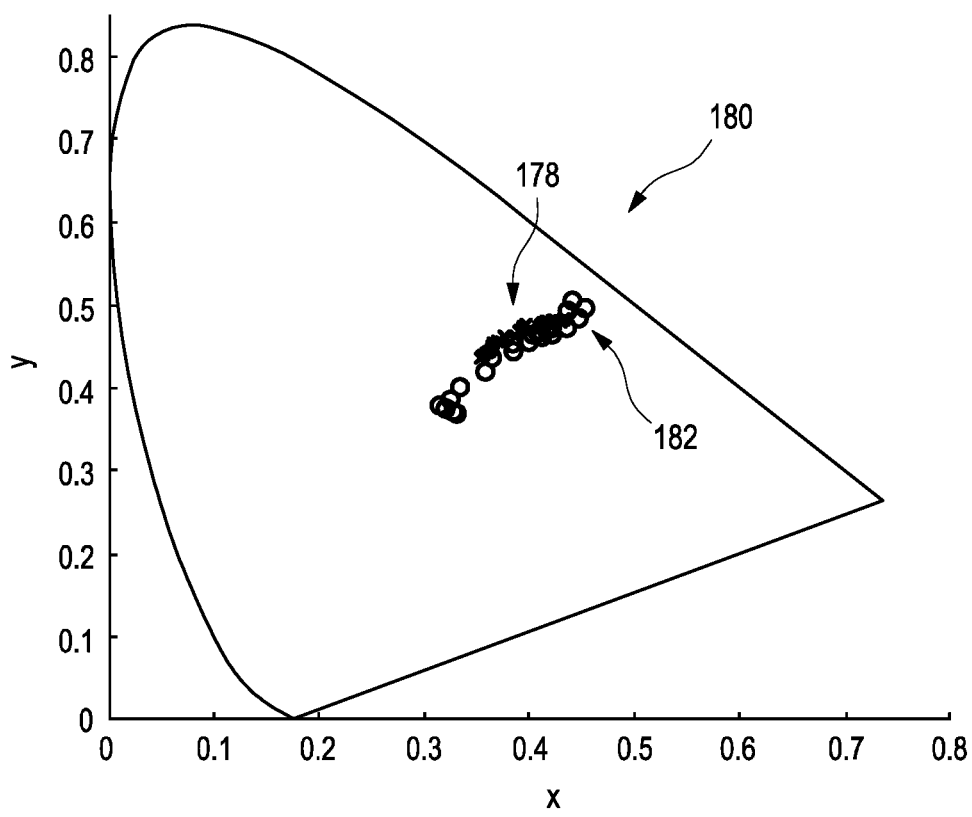
Figure 7:
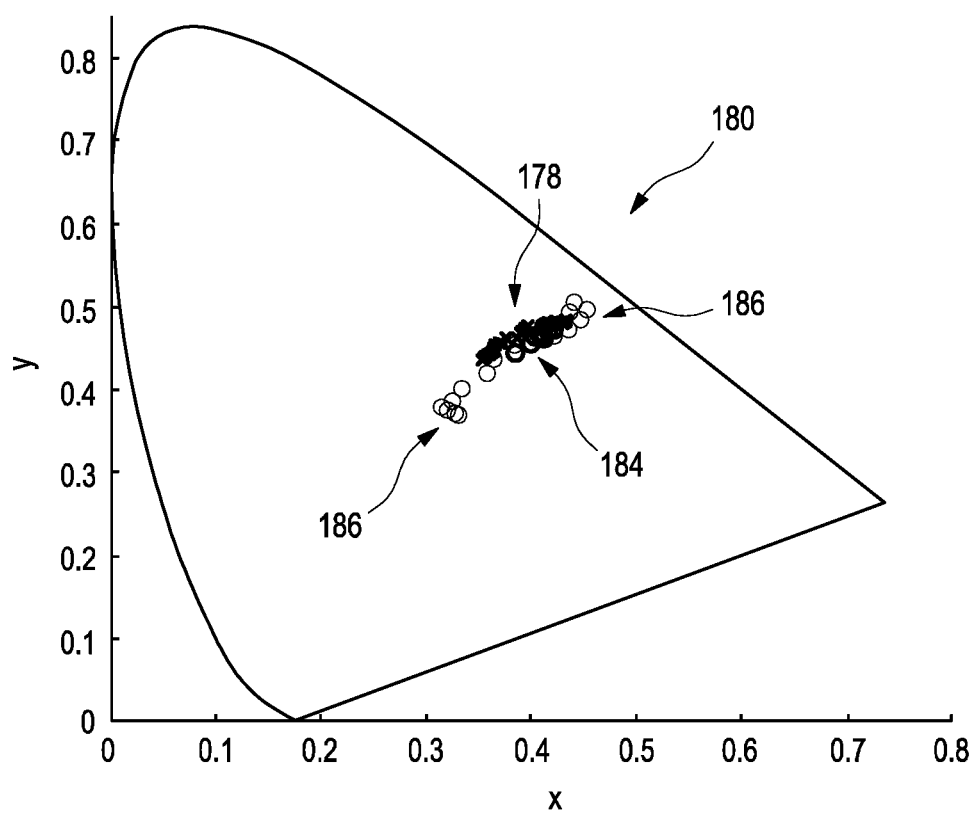

FIGS. 7a to 7c show a color subspace of the color formation reaction 178 in a color diagram 180. In FIG. 7a, the color subspace of the color formation reaction 178 of the test field 116 is represented by crosses in the color diagram 180. As can be seen in FIG. 7a, the color subspace 178 of the color formation reaction may fall into a small section of the color diagram 180. The color subspace 178 may correspond to measured color values for typical glucose concentrations, such as 20, 70, 120, 250 and 450 mg/dl. Thus, the selection of color reference fields 128 in step vi) of the method may comprise selecting color reference fields 128 in a predetermined subspace of the color space. The predetermined subspace may be or may comprise the color subspace of the color formation reaction 178.

Further, in FIG. 7b, the color subspace 178 is shown together with the color values of the color reference fields 128. The color values of the color reference fields 182 are shown as circles in the color diagram 180. As can be seen in FIG. 7b, the color space of the color reference fields 128 may exceed the color subspace of the color formation reaction 178. The color space of the color reference fields 128 may exceed the color subspace of color values for typical glucose concentrations and, thus, may cover color values up to higher glucose concentrations, for example, up to 600 mg/dl. Additionally or alternatively, the selection of color reference fields 128 in step vi) may comprise dynamically selecting color reference fields 128 in an environment of the color of the test field in the color space, wherein the environment may be or may comprise the color subspace of the color formation reaction 178.

In FIG. 7c, another example of selecting color reference fields 128 for the color correction is shown in the color diagram 180. In this example, color reference fields 128 may be weighted differently, specifically by giving color reference fields 128 having a color close to the color of the test field 116 (denoted by reference number 184) a higher weight than color reference fields 128 being further away from the color of the test field 116 in the color space (denoted by reference number 186). Generally, the analytical measurement may be accurate in a predetermined range of glucose concentrations, for example, in the normal range of 80 to 120 mg/dl. Thus, by selectively weighting color reference fields 128 having color values corresponding to the predetermined range of glucose concentrations, the accuracy of the analytical measurement in the predetermined range may be enhanced, wherein the accuracy in the other color subspace may be left aside. The selection of color reference fields 128 shown in FIG. 4 (denoted by reference number 184) may comprise color values of a color subspace corresponding to glucose concentrations of 40 to 160 mg/dl. Reference number 186 shows the remaining color values of the color reference fields 128.

As another example, color reference fields 128 may also be selected in accordance with an accuracy of the color correction, specifically an accuracy determined by cross-validating color reference fields 128. Further, based on the selection of color reference fields 128, the color correction, specifically the color correction matrix, may be determined and further applied to the first intensity-corrected image to obtain the intensity-corrected and color-corrected image which may further be used for the method of determining the concentration of at least one analyte in the sample of the bodily fluid.

Figure 8:
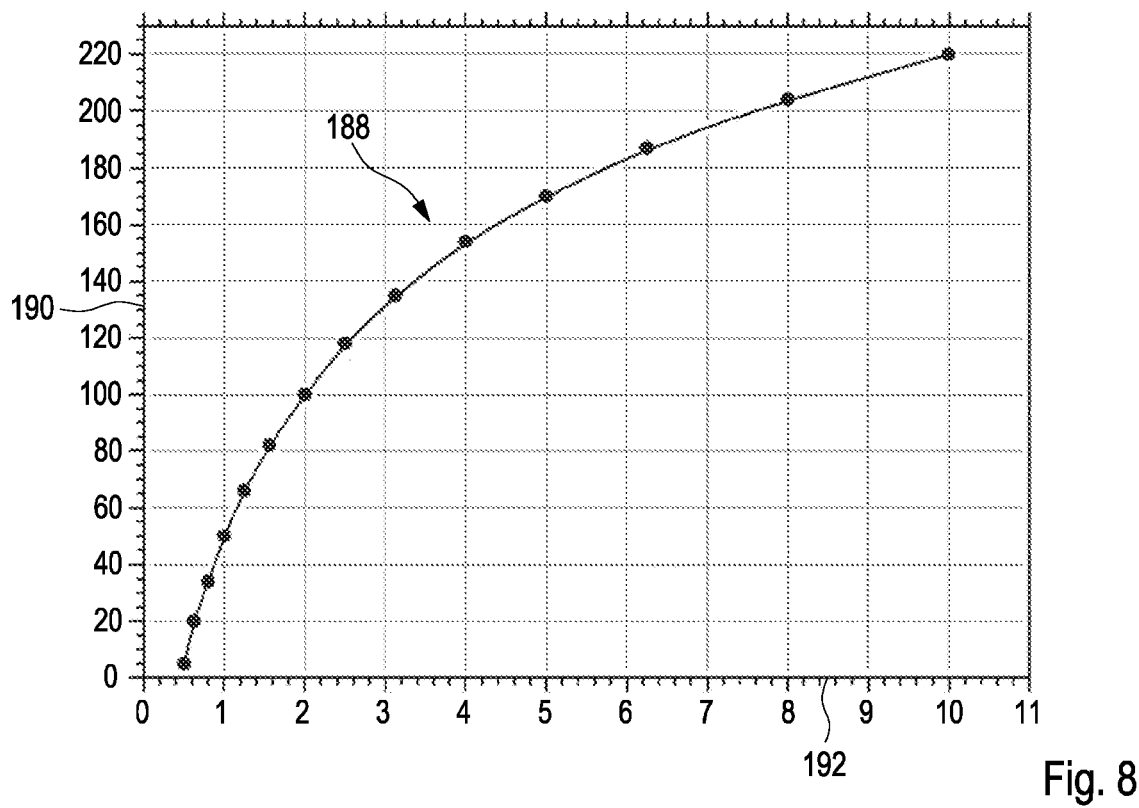
FIG. 8 shows an embodiment of a non-linear tone mapping curve.

In FIG. 8, an exemplary embodiment of a non-linear tone mapping curve 188 of the mobile device 112 is shown. Therein, a brightness value 190 of an imaged white field is shown in dependency on an exposure time 192. For example, the exposure time 192 may be measured in milliseconds (ms). The curve 188 in FIG. 8 shows a non-linear mapping curve 188 which is continuously growing with longer exposure times 192.

Figure 9:
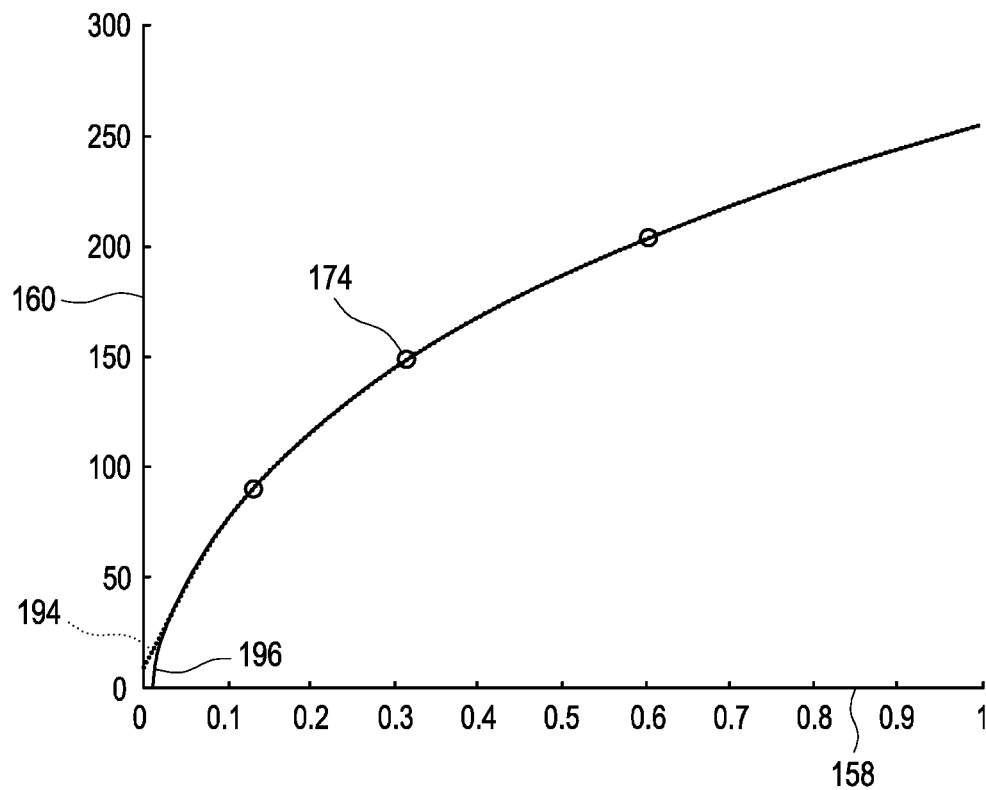
FIGS. 9a and 9b show embodiments of a reconstruction of the tone map correction of a mobile device.
Figure 9:
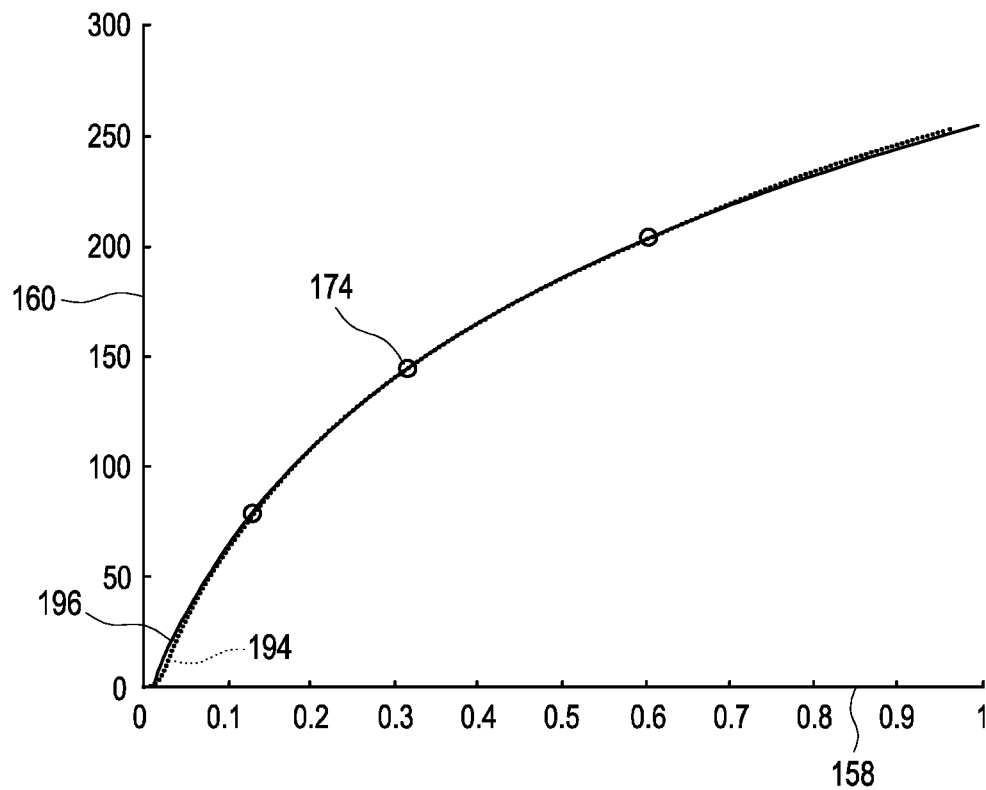

FIGS. 9a and 9b show exemplary embodiments of a reconstruction of the tone map corrections for two different mobile devices 112. In the FIGS. 9a and 9b, a forward calculation of the tone map correction 194 is compared to the original measured tone map correction 196 of the mobile device 112. The forward calculation may take into account the pixel-based mean tone map correction of step ii) and the local tone map correction of step iv) of the method. The comparison is shown for the best achieved forward calculation of the tone map correction 194 of a mobile device 112 in FIG. 9a and for the worst achieved forward calculation of the tone map correction 194 of another mobile device 112 in FIG. 9b. As can be seen in the FIGS. 9a and 9b, for both cases, the forward calculation of the tone map correction 194 yields a good approximation of the original measured tone map correction 196, specifically in between the local brightness information 174 of the evaluated points, representing for example, the at least three gray reference fields 126 having different gray levels. Thus, the pixel-based mean tone map correction and the local tone map correction may be appropriate to reproduce the original measured tone map correction 196 of the mobile device 112. Further, as can be seen in the FIGS. 9a and 9b, the forward calculation of the tone map correction 194 may deviate from the original measured tone map correction 196 only for dark pixel values in the best-achieved case (FIG. 9a) and for dark and bright pixel values in the worst-achieved case (FIG. 9b). Notwithstanding the deviations in the peripheral range, the approximation of the original measured tone map correction 196 by the pixel-based mean tone map correction and the local tone map correction may be considered very good in the intermediate range for both cases.

While exemplary embodiments have been disclosed hereinabove, the present invention is not limited to the disclosed embodiments. Instead, this application is intended to cover any variations, uses, or adaptations of this disclosure using its general principles. Further, this application is intended to cover such departures from the present disclosure as come within known or customary practice in the art to which this invention pertains and which fall within the limits of the appended claims.

LIST OF REFERENCE NUMBERS 110 kit
112 mobile device
114 optical test strip
116 reagent test field
118 color reference card
120 camera
122 processor
124 light source
126 gray reference field
128 color reference field
130 positioning element
132 window element
134 position marker
136 capturing at least one image
138 applying at least one predetermined pixel-based mean tone map correction to an image
140 deriving at least one local brightness information
142 applying at least one local tone map correction
144 determining the analyte concentration
146 deriving at least one color correction
148 applying a color correction
150 local group
152 local color reference field group
154 test field group
156 neighboring local color reference field group
158 light intensity
160 color value
161 measured red color value
162 measured green color value
163 measured blue color value 164 fit red color channel
165 fit green color channel
166 plurality of tone map corrections
167 fit blue color channel
168 graph of a mean tone map correction
170 plurality of resulting tone map corrections
172 parabolic approximation
173 resulting tone map correction
174 local brightness information
176 deviation
178 color subspace of a color formation reaction
180 color diagram
182 color values of color reference fields
184 color reference field having a color close to the color of the test field
186 color reference field having a color further away from the color of the test field
188 non-linear tone mapping curve
190 brightness value
192 exposure time
194 forward calculation of the tone map correction
196 original measured tone map correction

What is claimed is:

1. A method of determining the concentration of an analyte in a sample of a body fluid using a mobile device having a camera, the method comprising:
   i) using the camera to capture an image of at least a part of a color reference card and of at least a part of a reagent test field of an optical test strip having the sample applied thereto,
   wherein the test field is in a defined position in the image relative to the color reference card and the color reference card has a first plurality of different gray reference fields locally assigned to the test field,
   wherein the first plurality of different gray reference fields and the test field are locally assigned to each other by being placed in neighboring positions, or wherein the first plurality of different gray reference fields locally assigned to the test field are arranged on the color reference card such that the first plurality of different gray reference fields surrounds the test field,
   wherein the color reference card has a plurality of different color reference fields having known reference color values and a second plurality of different gray reference fields locally assigned to the plurality of different color reference fields, and
   wherein the second plurality of different gray reference fields and the plurality of different color reference fields are locally assigned to each other by being placed in neighboring positions or wherein the second plurality of different gray reference fields locally assigned to the plurality of different color reference fields are arranged on the color reference card such that the second plurality of different gray reference fields surrounds the plurality of different color reference fields,
   ii) applying a predetermined pixel-based mean tone map correction to the image obtained in step i), thereby obtaining a first intensity-corrected image, wherein the predetermined pixel-based mean tone map correction comprises an assignment of a second brightness value to a first brightness value, wherein the first brightness value is recorded by the camera, wherein each pixel of the recorded image is corrected individually by the predetermined pixel-based mean tone map correction;
   iii) deriving, from the first intensity-corrected image, local brightness information for at least one of the plurality of different color reference fields and for the test field by using gray reference fields of the first plurality of different gray reference fields and the second plurality of different gray reference fields which are locally assigned to the at least one color reference field and the test field, respectively, wherein the local brightness information comprises a numerical indication describing the local intensity of at least one RGB color of the at least one color reference field and the test field, respectively;
   iv) applying a mobile device-specific tone map correction to the first intensity-corrected image taking into account the local brightness information and thereby obtaining at least one second intensity-corrected image; and
   v) determining the analyte concentration based on a color formation reaction of the test field by using the second intensity-corrected image.

2. The method according to claim 1, further comprising:
   vi) deriving a color correction by using at least one of the color reference fields in the second intensity-corrected image; and
   vii) applying the color correction to the second intensity-corrected image and thereby obtaining an intensity-corrected and color-corrected image.

3. The method according to claim 2, further comprising, prior to step vi), local white balancing the at least one of the color reference field of step vi) and the test field.

4. The method according to claim 2, wherein, in step vi), the color correction is derived using a selection of the color reference fields based on at least one of:
   selecting the color reference fields in a predetermined color subspace of colors similar to the color formation reaction of the test field;
   dynamically selecting the color reference fields by selecting color reference fields having a color value similar to the color formation reaction of the test field;
   weighting the color reference fields differently; and
   selecting the color reference fields in accordance with an accuracy of the color correction.

5. The method according to claim 1, wherein the predetermined pixel-based mean tone map correction comprises: a mean tone map correction derived by combining a plurality of tone map corrections for different types of mobile devices, or an inverse of a standard Gamma correction.

6. The method according to claim 1, further comprising performing a statistical modification of the first intensity-corrected image to produce a statistically modified first intensity-corrected image, wherein step iv) is performed on the basis of the statistically modified first intensity-corrected image.

7. The method according to claim 1, wherein the first plurality of different gray reference fields locally assigned to the test field surround the test field and form a test field group.

8. The method according to claim 7, wherein the test field group comprises a plurality of redundant gray reference fields having at least three different gray levels, wherein at least two of the redundant gray reference fields are provided for each gray level, wherein the redundant gray reference fields are arranged symmetrically around the test field, wherein, in step iii), the local brightness information for the test field is determined by averaging over redundant gray reference fields having a common gray level.

9. The method according to claim 1, wherein the second plurality of different gray reference fields locally assigned to the plurality of different color reference fields surround each of the plurality of different color reference fields and wherein each color reference field and the gray reference fields locally assigned thereto form a local color reference field group.

10. The method according to claim 9, wherein each local color reference field group comprises a plurality of redundant gray reference fields having at least three different gray levels, wherein at least two of the plurality of redundant gray reference fields are provided for each gray level, wherein the plurality of redundant gray reference fields are arranged symmetrically around the color reference field of each local color reference field group.

11. The method according to claim 10, wherein, in step iii), the local brightness information for a respective local color reference field group is determined by averaging over the plurality of redundant gray reference fields of the respective local color reference field group having a common gray level.

12. A mobile device having a camera and a processor, the mobile device configured for performing a method of determining the concentration of an analyte in a sample of a body fluid wherein the method comprises:
   i) using the camera to capture an image of at least a part of a color reference card and of at least a part of a reagent test field of an optical test strip having the sample applied thereto,
   wherein the test field is in a defined position in the image relative to the color reference card and the color reference card has a first plurality of different gray reference fields locally assigned to the test field,
   wherein the first plurality of different gray reference fields and the test field are locally assigned to each other by being placed in neighboring positions, or wherein the first plurality of different gray reference fields locally assigned to the test field are arranged on the color reference card such that the first plurality of different gray reference fields surrounds the test field,
   wherein the color reference card has a plurality of different color reference fields having known reference color values and a second plurality of different gray reference fields locally assigned to the plurality of different color reference fields, and
   wherein the second plurality of different gray reference fields and the plurality of different color reference fields are locally assigned to each other by being placed in neighboring positions or wherein the second plurality of different gray reference fields locally assigned to the plurality of different color reference fields are arranged on the color reference card such that the second plurality of different gray reference fields surrounds the plurality of different color reference fields,
   ii) applying a predetermined pixel-based mean tone map correction to the image obtained in step i), thereby obtaining a first intensity-corrected image, wherein the predetermined pixel-based mean tone map correction comprises an assignment of a second brightness value to a first brightness value, wherein the first brightness value is recorded by the camera, wherein each pixel of the recorded image is corrected individually by the predetermined pixel-based mean tone map correction;
   iii) deriving, from the first intensity-corrected image, local brightness information for at least one of the plurality of different color reference fields and for the test field by using gray reference fields of the first plurality of different gray reference fields and the second plurality of different gray reference fields which are locally assigned to the at least one color reference field and the test field, respectively, wherein the local brightness information comprises a numerical indication describing the local intensity of at least one RGB color of the at least one color reference field and the test field, respectively;
   iv) applying a mobile device-specific tone map correction to the first intensity-corrected image taking into account the local brightness information and thereby obtaining at least one second intensity-corrected image; and
   v) determining the analyte concentration based on a color formation reaction of the test field by using the second intensity-corrected image.

13. A kit for determining the concentration of an analyte in a sample of a body fluid, the kit comprising:
   the mobile device according to claim 12;
   the optical test strip having the reagent test field; and
   the color reference card.

14. A non-transitory computer readable medium having stored thereon computer-executable instructions which are adapted to configure the mobile device of claim 12 to determine the concentration of the analyte.

* * * * *